US009904778B2

United States Patent
Terashita

(10) Patent No.: US 9,904,778 B2
(45) Date of Patent: *Feb. 27, 2018

(54) FUNCTION PERFORMING APPARATUS AND PORTABLE DEVICE

(71) Applicant: Brother Kogyo Kabushiki Kaisha, Nagoya-shi, Aichi-ken (JP)

(72) Inventor: Kunihito Terashita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,751

(22) Filed: Mar. 27, 2017

(65) Prior Publication Data

US 2017/0199999 A1 Jul. 13, 2017

Related U.S. Application Data

(63) Continuation of application No. 14/497,397, filed on Sep. 26, 2014, now Pat. No. 9,619,641.

(30) Foreign Application Priority Data

Sep. 30, 2013 (JP) ................................ 2013-205321

(51) Int. Cl.
*G06F 21/00* (2013.01)
*G06F 21/35* (2013.01)
*G06F 21/34* (2013.01)

(52) U.S. Cl.
CPC .............. *G06F 21/35* (2013.01); *G06F 21/34* (2013.01)

(58) Field of Classification Search
CPC .................................. G06F 21/34; G06F 21/35
See application file for complete search history.

(56) References Cited

U.S. PATENT DOCUMENTS 9,619,641 B2 * 4/2017 Terashita ................ G06F 21/34
2002/0026586 A1 * 2/2002 Ito .......................... G06F 21/35
713/183

(Continued)

FOREIGN PATENT DOCUMENTS

JP 2007-310426 A 11/2007
JP 2008-146551 A 6/2008
JP 2010-108348 A 5/2010

OTHER PUBLICATIONS

Feb. 28, 2017—(JP) Notification of Reasons for Refusal—App 2013-205321.

*Primary Examiner* — Mohammad A Siddiqi
(74) *Attorney, Agent, or Firm* — Banner & Witcoff, Ltd.

(57) ABSTRACT

A function performing apparatus includes a function performing unit performing a specific function, a processor, and memory storing computer-readable instructions therein, the computer-readable instructions, when executed by the processor, causing the function performing apparatus to perform, in response to receiving a user authentication information when the user authentication information has been registered in an authentication memory, transitioning a state of the apparatus from a non-permission state to a permission state, registering, in the authentication memory, a device authentication information in association with the user authentication information upon establishing a first connection with a portable device, and transitioning the state of the apparatus from the non-permission state to the permission state when a second connection with the portable device is established and the device authentication information is obtained from the portable device.

16 Claims, 9 Drawing Sheets

(56) References Cited

U.S. PATENT DOCUMENTS

| | | | |
|---|---|---|---|
| 2006/0049962 A1* | 3/2006 | Okada | B60R 25/24 340/901 |
| 2006/0053299 A1* | 3/2006 | Tomita | G06F 3/0622 713/182 |
| 2007/0168292 A1 | 7/2007 | Jogand-Coulomb et al. | |
| 2008/0079990 A1* | 4/2008 | Iida | G06F 21/608 358/1.15 |
| 2008/0178265 A1 | 7/2008 | Tsuchiya et al. | |
| 2009/0210927 A1 | 8/2009 | Mokuya et al. | |
| 2011/0173686 A1 | 7/2011 | Ueno et al. | |
| 2014/0081746 A1 | 3/2014 | Gomi | |
| 2015/0096015 A1 | 4/2015 | Ren | |
| 2015/0205550 A1 | 7/2015 | Lee et al. | |

\* cited by examiner

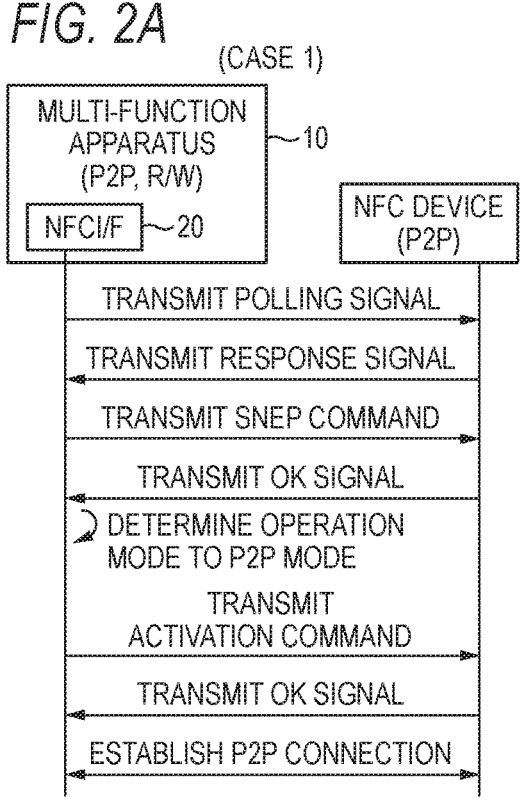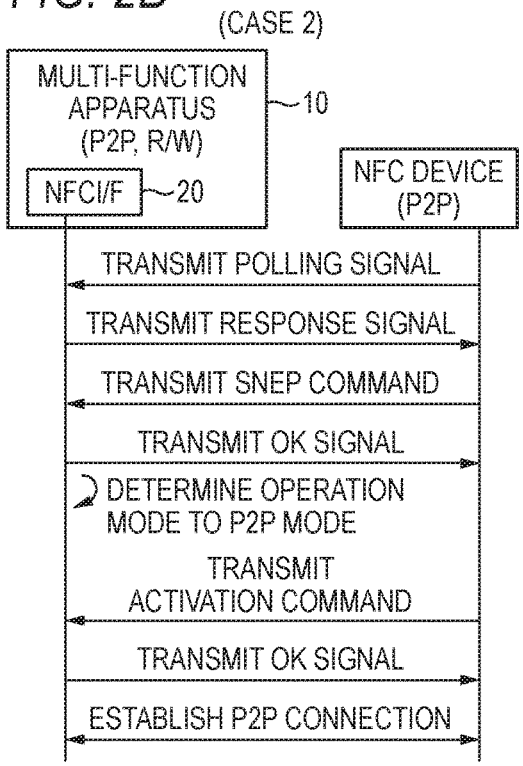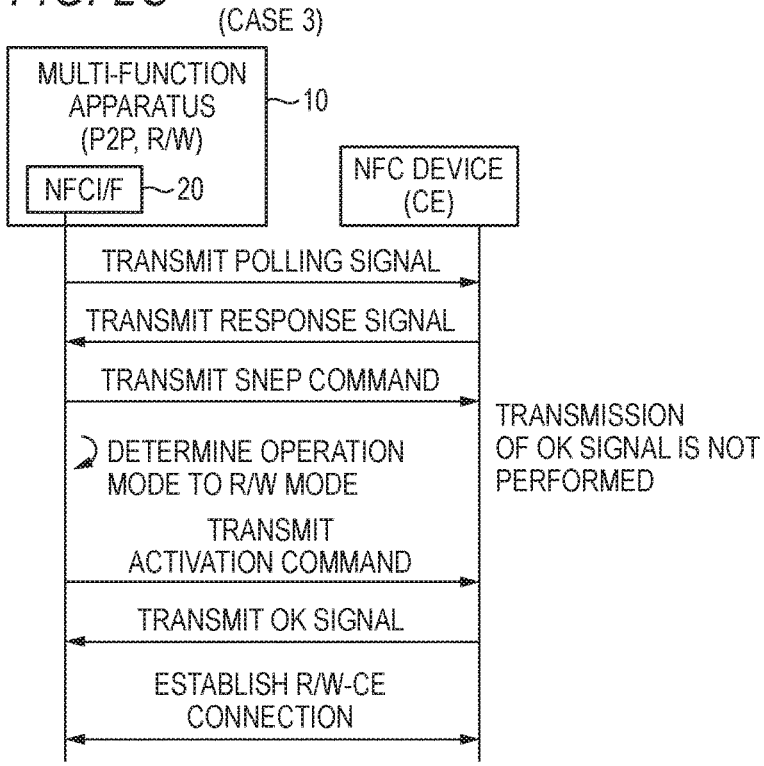

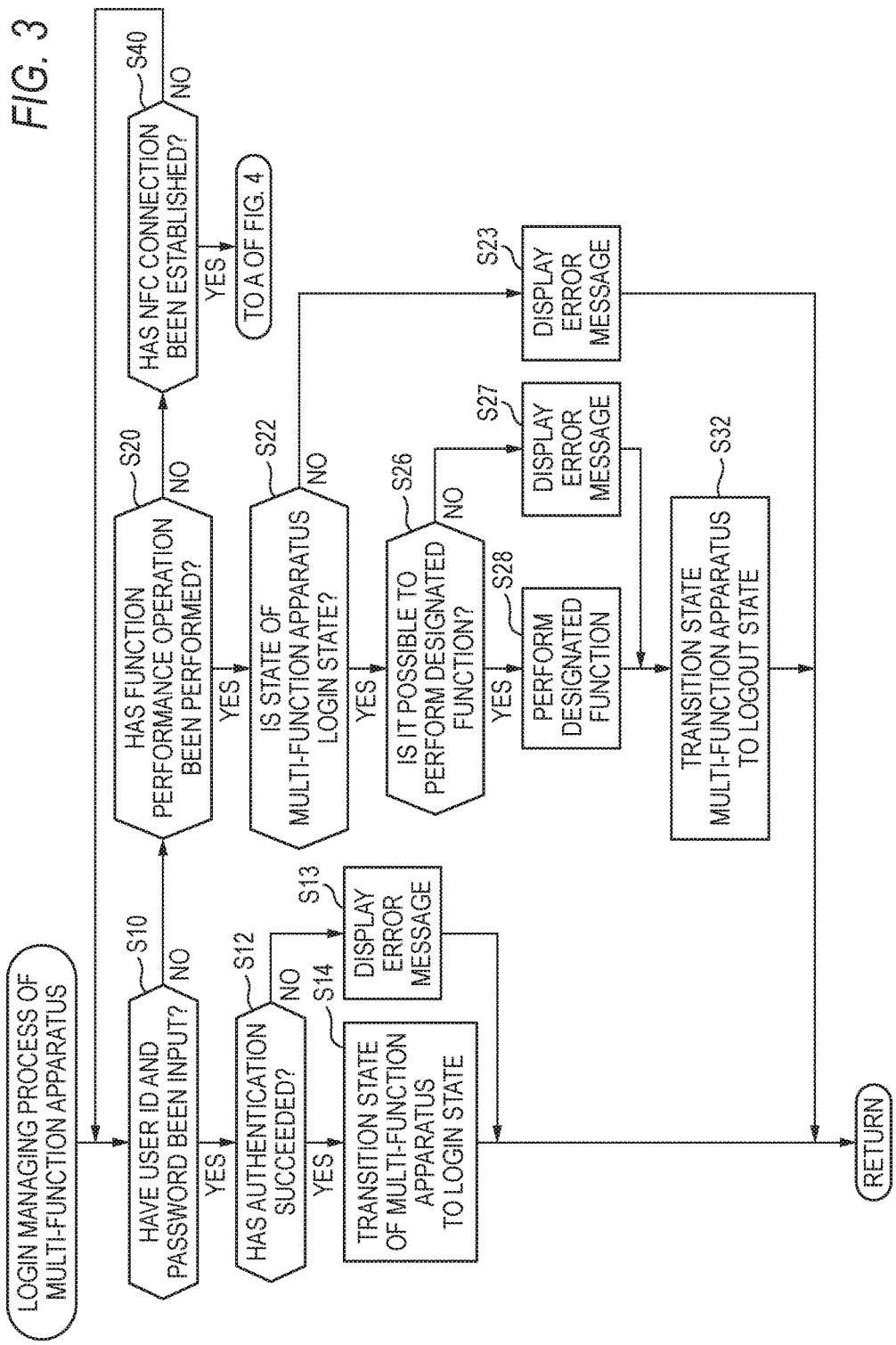

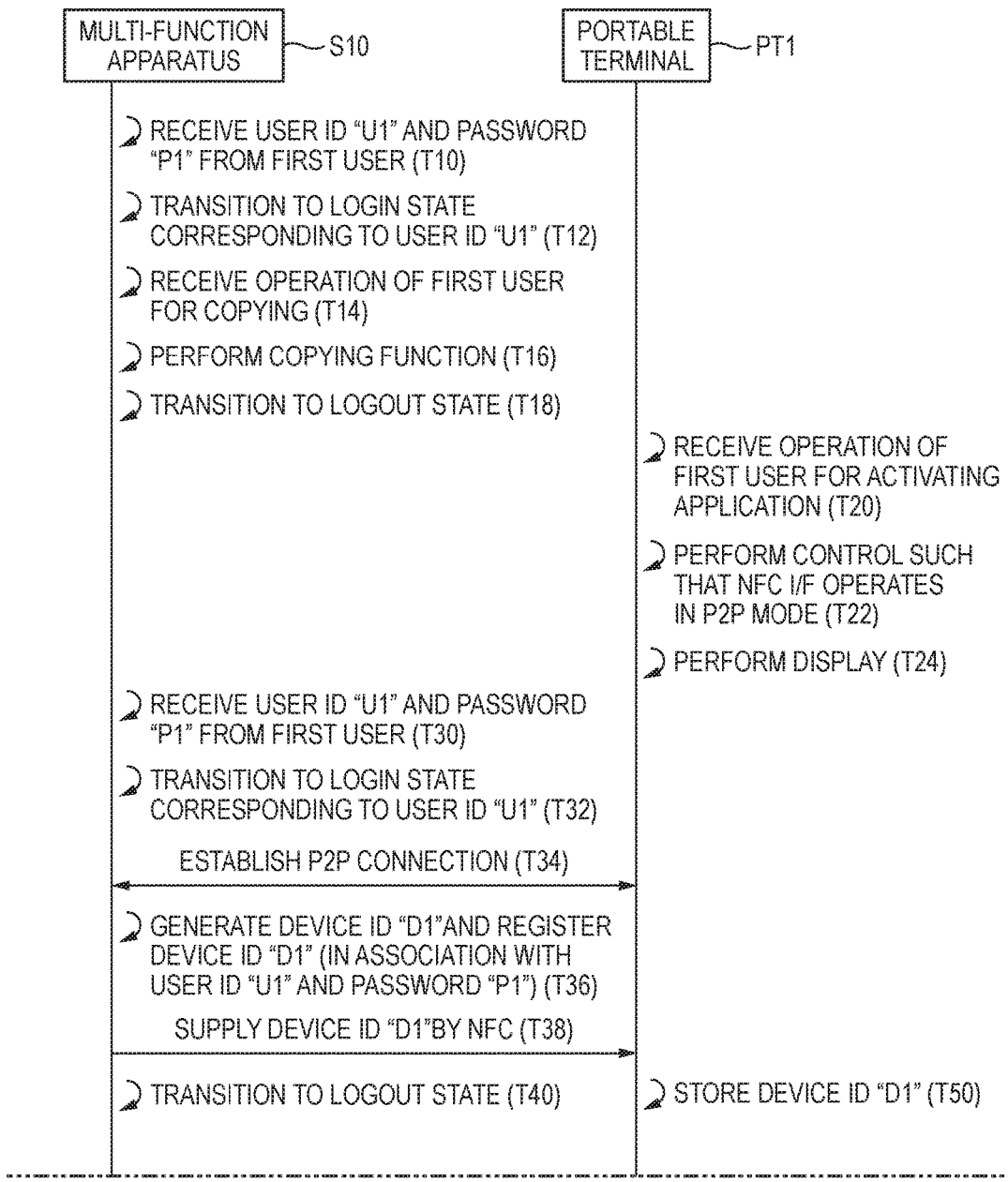

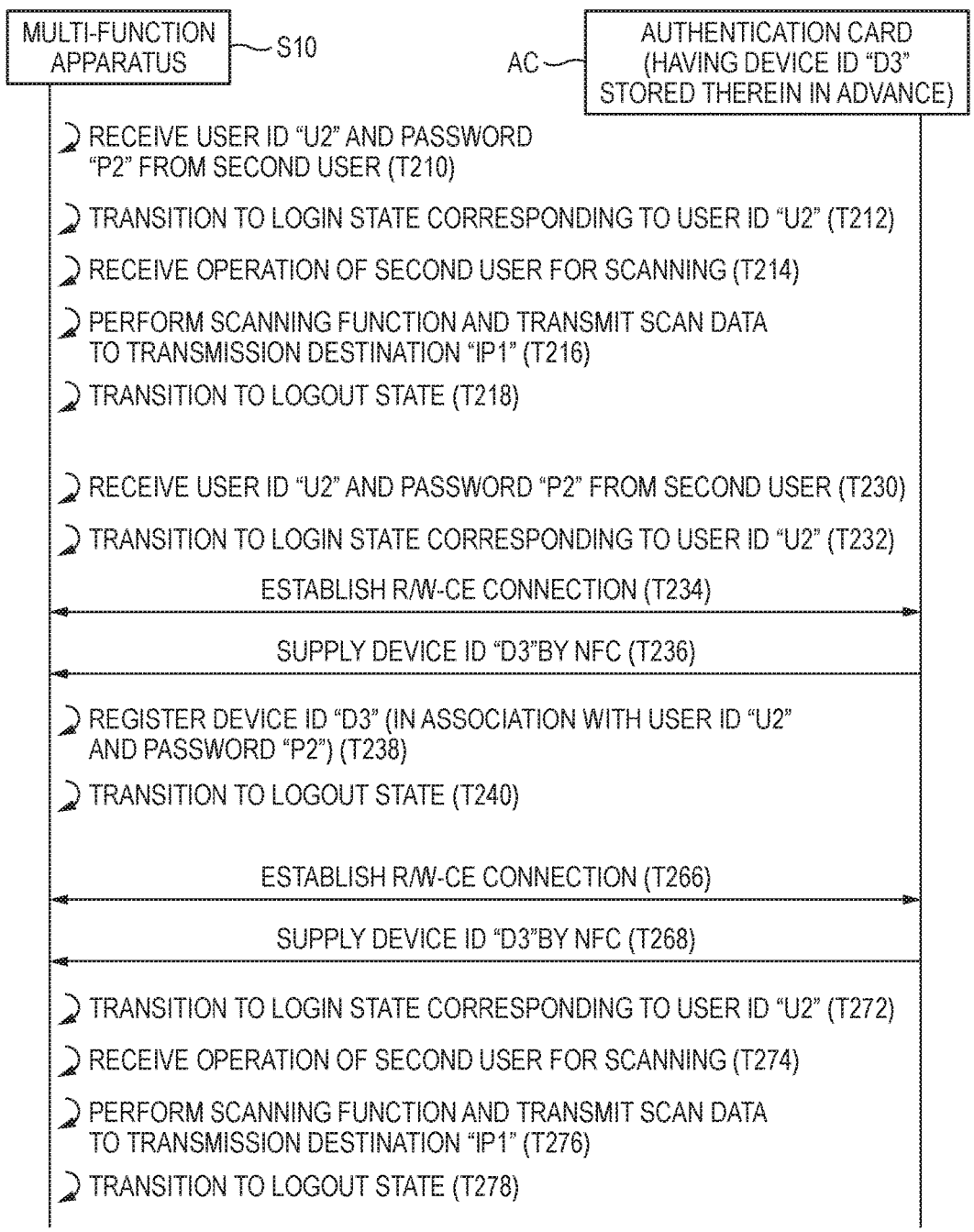

FUNCTION PERFORMING APPARATUS AND PORTABLE DEVICE

CROSS-REFERENCE TO RELATED APPLICATIONS

This application is a continuation of U.S. patent application Ser. No. 14/497,397 filed Sep. 26, 2014, which claims priority from Japanese Patent Application No. 2013-205321 filed on Sep. 30, 2013, the entire subject-matter of which is incorporated herein by reference.

TECHNICAL FIELD

The disclosure relates to a function performing apparatus configured to perform a specific function, and a portable device for enabling using the function performing apparatus to perform the specific function.

BACKGROUND

There has been disclosed a multi-function apparatus in which, in a case where user information is input to the multi-function apparatus, the multi-function apparatus makes an authentication server perform authentication on the user information. If the authentication on the user information succeeds, the multi-function apparatus obtains card information from a card brought into contact with a card reader of the multi-function apparatus and supplies the card information to the authentication server. The authentication server registers the card information in association with the user information. Therefore, a user can log in to the multi-function apparatus by bringing the card into contact with the card reader of the multi-function apparatus, without inputting the user information to the multi-function apparatus.

SUMMARY

The above-described related-art technology is based upon the premise that card information has been stored in a card in advance. Therefore, the user is to prepare a card having card information stored in advance. Illustrative aspects of the present invention provide a technology capable of using a portable device, in which any device authentication information has not been stored in advance, for making a function performing apparatus perform a specific function.

According to one illustrative aspect of the present invention, there may be provided a function performing apparatus comprising: a function performing unit configured to perform a specific function; an operation unit configured to receive a user operation; a processor; and memory storing computer-readable instructions therein, the computer-readable instructions, when executed by the processor, causing the function performing apparatus to perform: receiving, through the operation unit, a first user authentication information on a condition that the first user authentication information has been registered in an authentication memory; in response to receiving the first user authentication information, transitioning a state of the function performing apparatus from a first non-permission state where the a first user is not permitted to use the specific function to a first permission state where the first user is permitted to use the specific function; registering, in the authentication memory, a first device authentication information in association with the first user authentication information in response to a first connection with a first portable device being established; supplying, to the first portable device, the first device authentication information in response to the first connection with the first portable device being established; obtaining, from the first portable device, the first device authentication information in response to a second connection with the first portable device being established after the first device authentication information is registered in the authentication memory; and transitioning the state of the function performing apparatus from the first non-permission state to the first permission state in response to the first device authentication information being obtained from the first portable device.

According to this configuration, in a case where the first user operates the operation unit and inputs the first user authentication information to the function performing apparatus, the function performing apparatus transitions the state of the function performing apparatus to the first permission state. Therefore, the first user can make the function performing apparatus perform the specific function. Further, the function performing apparatus registers the first device authentication information in association with the first user authentication information in the memory, and supplies the first device authentication information to the first portable device. That is, even if any device authentication information has not been stored in the first portable device in advance, the function performing apparatus is able to assign the first device authentication information to the first portable device. Thereafter, in a case of obtaining the first device authentication information from the first portable device, the function performing apparatus transitions the state of the function performing apparatus to the first permission state. Therefore, the first user can use the first portable device in which any device authentication information has not been stored in advance, to make the function performing apparatus perform the specific function.

According to another illustrative aspect of the present invention, there may be provided a portable device comprising: a processor; and a memory storing computer-readable instructions therein, the computer-readable instructions, when executed by the processor, casing the portable device to perform: obtaining, from a function performing apparatus that is configured to perform a specific function, a first device authentication information in response to a first connection with the function performing apparatus being established; storing the first device authentication information in the memory in response to obtaining, from the function performing apparatus, the first device authentication information; and in response to a second connection with the function performing apparatus being established after the first device authentication information is stored in the memory, supplying, to the function performing apparatus, the first device authentication information in order to transition a state of the function performing apparatus from a non-permission state where a user of the portable device is not permitted to use the specific function to a permission state where the user is permitted to use the specific function.

According to this configuration, even if there is no device authentication information stored in advance in the portable device, the portable device is able to obtain the first device authentication information from the function performing apparatus, and to store the first device authentication information in the device memory. Thereafter, the portable device is able to supply the first device authentication information to the function performing apparatus, thereby transitioning the state of the function performing apparatus to the permission state. Therefore, the user can use the portable device, in which any device authentication information has not been stored in advance, to make the function performing apparatus perform the specific function.

Control methods and computer programs for implementing the function performing apparatus or the portable device described above, and a non-transitory computer-readable recording medium having the corresponding computer programs stored thereon also are new and useful. Further, a communication system including the function performing apparatus and the portable device described above is new and useful.

BRIEF DESCRIPTION OF THE DRAWINGS

FIGS. 2A to 2C are views illustrating a manner in which an NFC connection is established between a multi-function apparatus and an NFC device;

FIG. 3 is a flow chart illustrating a login managing process of the multi-function apparatus;

FIGS. 6A and 6B are sequence diagrams illustrating processes which are performed by the multi-function apparatus and a portable terminal;

FIG. 8 is a sequence diagram illustrating processes which are performed by the multi-function apparatus and an authentication card.

DETAILED DESCRIPTION (Configuration of Communication System 2)

Figure 1:
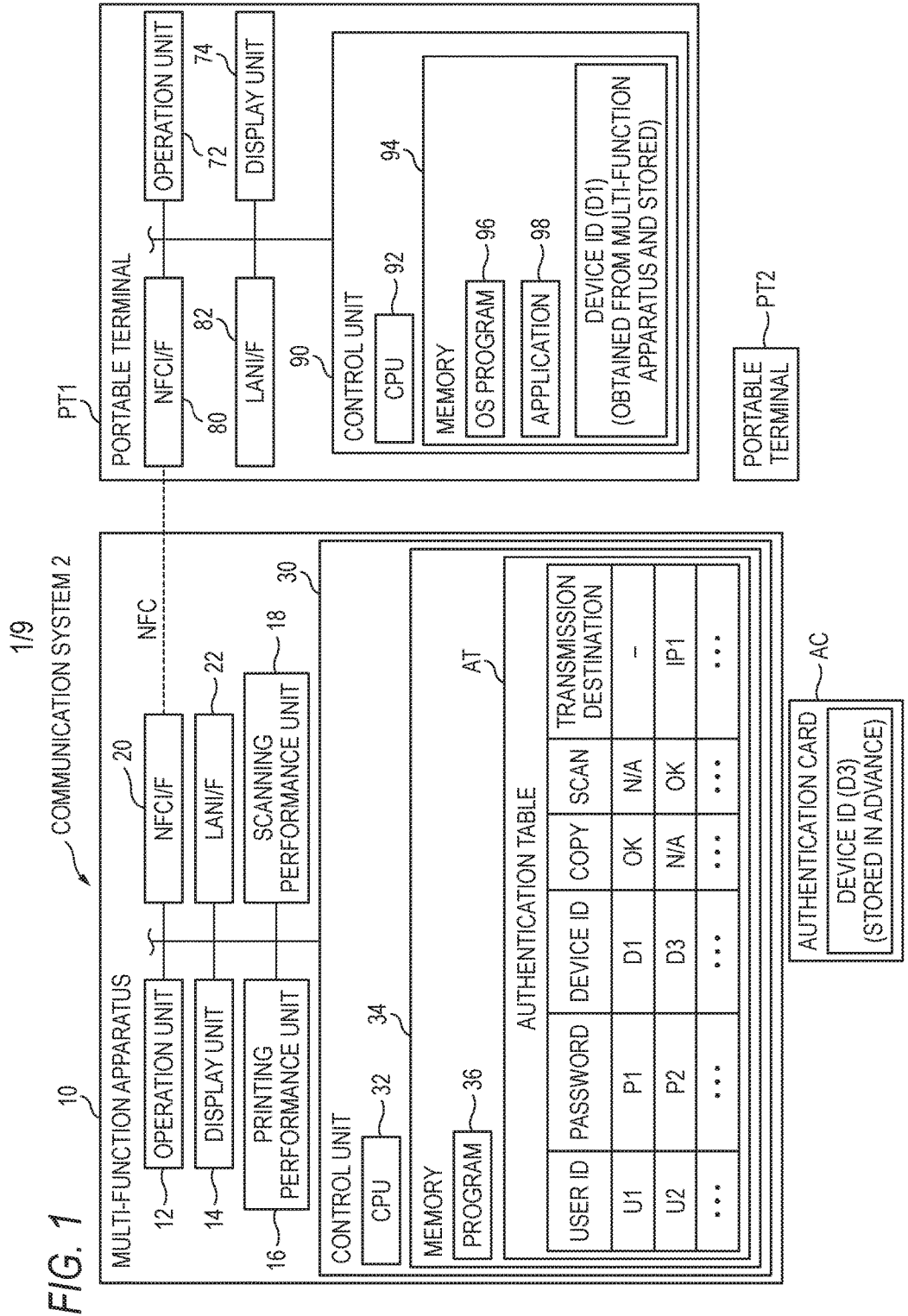
FIG. 1 is a view illustrating the configuration of a communication system.

As shown in FIG. 1, a communication system 2 may include a multi-function apparatus 10, a plurality of portable terminals PT1 and PT2, and an authentication card AC.

(Configuration of Multi-Function Apparatus 10)

The multi-function apparatus 10 is a peripheral device capable of performing multiple functions such as a printing function, a scanning function, and a copying function (that is, a peripheral device such as a personal computer (PC) not shown). The multi-function apparatus 10 includes an operation unit 12, a display unit 14, a printing performance unit 16, a scanning performance unit 18, a near field communication (NFC) interface 20, a local area network (LAN) interface 22, and a control unit 30. The individual units 12 to 30 are connected to a bus line (whose reference symbol is omitted). Hereinafter, the term "interface" will be referred to as "I/F."

The operation unit 12 includes a plurality of keys. A user can operate the operation unit 12 and input a variety of instructions to the multi-function apparatus 10. The display unit 14 is a display for displaying a variety of information. The printing performance unit 16 is a printing mechanism such as an inkjet type mechanism or a laser type mechanism. The scanning unit 18 is a scanning mechanism such a CCD or a CIS.

The NFC I/F 20 is an I/F for performing NFC according to an NFC scheme. The NFC scheme is a wireless communication scheme for performing near field communication, for example, according to the international standards of ISO/IEC 21481 or 18092. The NFC I/F 20 is configured to operate in a peer to peer (P2P) mode and a reader/writer (R/W) mode.

The LAN I/F 22 is an I/F for performing wireless communication according to Wi-Fi (that is, Wi-Fi communication). Alternatively, as a modification, the LAN I/F 22 may be an I/F for performing wired communication. The Wi-Fi is a wireless communication technology for performing wireless communication, for example, according to the standards of 802.11 of the Institute of Electrical and Electronics Engineers, Inc. (IEEE), and standards (for example, 802.11a, 802.11b, 802.11g or 802.11n) based on the standards of 802.11.

Now, the difference between wired communication through the NFC I/F 20 and wireless communication through the LAN I/F 22 will be described. The communication rate of wireless communication through the LAN I/F 22 (e.g., the maximum communication rate thereof may be 11 Mbps to 600 Mbps) is higher than the communication rate of wireless communication through the NFC I/F 20 (e.g., the maximum communication rate thereof may be 100 Kbps to 424 Kbps). Further, the frequencies of carrier waves in wireless communication through the LAN I/F 22 (for example, 2.4 GHz band or 5.0 GHz band) are different from the frequencies of carrier waves in wireless communication through the NFC I/F 20 (for example, 13.56 MHz band). Furthermore, a maximum distance (for example, at most 100 m) within which the multi-function apparatus 10 can perform wireless communication with an external device through the LAN I/F 22 is longer than a maximum distance (for example, at most 10 cm) within which the multi-function apparatus 10 can perform wireless communication with an external device through the NFC I/F 20.

The control unit 30 includes a CPU 32 and a memory 34. The CPU 32 performs various processes according to programs 36 stored in the memory 34. The memory 34 stores an authentication table AT, in addition to the programs 36 described above.

The authentication table AT can store a plurality of combination information items corresponding to a plurality of users. Each combination information item is information including a user ID, a password, a device ID, copy permission information, scan permission information, and transmission destination information associated with one another. The user ID and the password are user authentication information for authenticating a user. The device ID is device authentication information for authenticating a device (such as the portable terminal PT1 or PT2, or the authentication card AC) that is different from the multi-function apparatus 10. The copy permission information is information representing whether the user is permitted to perform the copying function, and the scan permission information is information representing whether the user is permitted to perform the scanning function, and each of the copy permission information and the scan permission information represents any one of values "OK" and "N/A". The value "OK" represents that the user is permitted to perform the corresponding function (the copying function or the scanning function). The value "N/A" represents that the user is not permitted to perform the corresponding function. The transmission destination information is information representing the transmission destination of scan data generated by performing the scanning function, and represents the IP address of an external device such as a PC.

The administrator of the communication system 2 accesses the multi-function apparatus 10 and registers information in the authentication table AT, for example, by operating the operation unit 12 of the multi-function apparatus 10, or by using a PC (not shown). Specifically, the administrator inputs a user ID (for example, "U1" or "U2"), a password (for example, "P1" or "P2"), copy permission information (that is, "OK" or "N/A"), and scan permission information (that is, "OK" or "N/A"), to the multi-function apparatus 10. In a case of inputting scan permission information "OK", the administrator further inputs transmission destination information (for example, "IP1") to the multi-function apparatus 10. Then, the CPU 32 of the multi-function apparatus 10 registers the input information in the authentication table AT.

The administrator does not input any device ID to the multi-function apparatus 10. Therefore, in a stage when information such as a user ID is registered in the authentication table AT by the administrator, any device ID is not registered in the authentication table AT. In a case where an NFC connection with the portable terminal PT1 or PT2 is established, for example, the CPU 32 generates a device ID and registers the corresponding device ID in the authentication table AT. Further, in a case where an NFC connection with the authentication card AC is established, for example, the CPU 32 obtains a device ID from the authentication card AC and registers the corresponding device ID in the authentication table AT.

(Configurations of Portable Terminals PT1 and PT2)

Each portable terminal PT1 or PT2 is a portable device such as a mobile phone (for example, a smart phone), a personal digital assistant (PDA), a laptop, a tablet PC, a portable audio player, or a portable video player.

The configuration of the portable terminal PT1 will be described. Incidentally, the portable terminal PT2 has the similar configuration as that of the portable terminal PT1. The portable terminal PT1 includes an operation unit 72, a display unit 74, an NFC I/F 80, a LAN I/F 82, and a control unit 90. The individual units 72 to 90 are connected to a bus line (whose reference symbol is omitted).

The operation unit 72 includes a plurality of keys. A user can operate the operation unit 72 and input a variety of instructions to the portable terminal PT1. The display unit 74 is a display for displaying a variety of information. The NFC I/F 80 and the LAN I/F 82 are the substantially the same as the NFC I/F 20 and the LAN I/F 22 of the multi-function apparatus 10, respectively. Therefore, the portable terminal PT1 is able to perform each of NFC and Wi-Fi communication. Incidentally, the NFC I/F 80 is able to operate not only in the P2P mode and the R/W mode but also in a card emulation (CE) mode.

The control unit 90 includes a CPU 92 and a memory 94. The CPU 92 is a processor which performs various processes according to programs 96 and 98 stored in the memory 94.

The operating system (OS) program 96 is a program for implementing the basic operations of the portable terminal PT1. The application 98 is a program for using the multi-function apparatus 10, and is, more specifically, a program for implementing a process in which the portable terminal PT1 obtains a device ID from the multi-function apparatus 10, and a process of logging in to the multi-function apparatus 10 by use of the portable terminal PT1. The application 98 is provided by the vendor of the multi-function apparatus 10. Incidentally, the application 98 may be downloaded from a server on the Internet and be installed in the portable terminal PT1, or may be loaded from a medium shipped together with the multi-function apparatus 10 and be installed in the portable terminal PT1.

The memory 94 can store a device ID in addition to the above-described programs 96 and 98. The device ID is information which is obtained from the multi-function apparatus 10. Therefore, before the device ID is obtained from the multi-function apparatus 10, the portable terminal PT1 does not have any device ID stored therein. After the device ID is obtained from the multi-function apparatus 10, the portable terminal PT1 stores the device ID.

(Configuration of Authentication Card AC)

The authentication card AC is a portable card which is provided for the administrator of the communication system 2 from the vendor of the multi-function apparatus 10. The administrator of the communication system 2 can provide the authentication card AC for the user. As a result, the user can use the authentication card AC to log in to the multi-function apparatus 10.

The authentication card AC has an NFC I/F (not shown) and is configured to perform NFC. The NFC I/F of the authentication card AC is an I/F acting as an NFC standard card. An NFC standard card is able to perform the same operation as that of the CE mode described above, but is unable to perform the operations of the P2P mode and the R/W mode.

Further, the authentication card AC includes a memory (not shown), and the corresponding memory stores a device ID "D3", which is a combination of a plurality of alphabets and/or numeric characters, in advance. The device ID "D3" of the authentication card AC has the predetermined number of characters.

(NFC Connection (FIGS. 2A to 2C))

Subsequently, with reference to FIGS. 2A to 2C, an NFC connection established between the NFC I/F 20 of the multi-function apparatus 10 and the NFC I/F of an NFC device will be described. The NFC device of FIGS. 2A to 2C is a device capable of establishing an NFC connection with the multi-function apparatus 10, and is, for example, the portable terminal PT1 or PT2, or the authentication card AC.

(Case 1)

Case 1 represents a case where the NFC I/F 20 of the multi-function apparatus 10 operates in the P2P mode and the R/W mode, and the NFC I/F of the NFC device operates only in the P2P mode. The NFC I/F 20 of the multi-function apparatus 10 repeatedly performs a set of sequential operations of a Poll operation and a Listen operation. Also, the NFC device which operates only in the P2P mode repeatedly performs the above-described one set of operations.

A Poll operation is an operation of transmitting a polling signal and monitoring reception of a response signal. A Listen operation is an operation of monitoring reception of a polling signal, and transmitting a response signal if a polling signal is received. In Case 1, a period when the NFC I/F 20 of the multi-function apparatus 10 performs a Poll operation, and a period when the NFC I/F of the NFC device performs a Listen operation coincide with each other. As a result, the multi-function apparatus 10 transmits a polling signal to the NFC device and receives a response signal from the NFC device.

In a case where a response signal is received from the NFC device, the multi-function apparatus 10 transmits, to the NFC device, a SNEP (the abbreviation for Simple NDEF Exchange Protocol) command for checking whether the NFC device is operating in the P2P mode. Incidentally, NDEF is the abbreviation for NFC Data Exchange Format.

Since the NFC device is operating in the P2P mode, in a case where the SNEP command is received from the multi-function apparatus 10, the NFC device transmits an OK signal to the multi-function apparatus 10.

In a case where the OK signal is received from the NFC device, the multi-function apparatus 10 determines that it is to establish a connection for operating in the P2P mode of the P2P mode and the R/W mode. Then, the multi-function apparatus 10 transmits an Activation command to the NFC device. The Activation command is a command which is transmitted from the apparatus having performed the Poll operation to the device having performed the Listen operation. Next, the multi-function apparatus 10 receives an OK signal from the NFC device. As a result, a P2P connection is established between the NFC I/F 20 of the multi-function apparatus 10 and the NFC I/F of the NFC device such that both NFC I/Fs operate in the P2P mode.

The multi-function apparatus 10 and the NFC device can use the P2P connection to perform bidirectional communication of a variety of data.

(Case 2)

Similarly in Case 1, even in Case 2, the NFC I/F 20 of the multi-function apparatus 10 operates in the P2P mode and the R/W mode, and the NFC I/F of the NFC device operates only in the P2P mode. In Case 2, a period when the NFC I/F 20 of the multi-function apparatus 10 performs a Listen operation, and a period when the NFC I/F of the NFC device performs a Poll operation coincide with each other. As a result, the multi-function apparatus 10 receives a polling signal from the NFC device, and transmits a response signal to the NFC device.

Thereafter, the multi-function apparatus 10 receives an SNEP command from the NFC device. As a result, the multi-function apparatus 10 is able to recognize that the NFC device is operating in the P2P mode, and thus transmits an OK signal to the NFC device. Then, the multi-function apparatus 10 determines that it is to establish a connection for operating in the P2P mode of the P2P mode and the R/W mode. The multi-function apparatus 10 receives an activation command from the NFC device, and transmits an OK signal to the NFC device. As a result, a P2P connection is established between the NFC I/F 20 of the multi-function apparatus 10 and the NFC I/F of the NFC device.

(Case 3)

Case 3 represents a case where the NFC I/F 20 of the multi-function apparatus 10 operates in the P2P mode and the R/W mode, and the NFC I/F of the NFC device operates only in the CE mode. The NFC device operating only in the CE mode performs only a Listen operation, without performing a Poll operation. Therefore, the multi-function apparatus 10 transmits a polling signal to the NFC device and receives a response signal from the NFC device.

In a case where the response signal is received from the NFC device, the multi-function apparatus 10 transmits an SNEP command to the NFC device. Since the NFC device is not operating in the P2P mode (that is, since the NFC device is operating only in the CE mode), even if the SNEP command is received from the multi-function apparatus 10, the NFC device does not transmit an OK signal to the multi-function apparatus 10.

In a case where any OK signal is not received from the NFC device, the multi-function apparatus 10 determines that it is to establish a connection for operating in the R/W mode of the P2P mode and the R/W mode. Then, the multi-function apparatus 10 transmits an activation command to the NFC device and receives an OK signal from the NFC device. As a result, an R/W-CE connection is established between the NFC I/F 20 of the multi-function apparatus 10 and the NFC I/F of the NFC device. The R/W-CE connection is a connection in which the NFC I/F 20 of the multi-function apparatus 10 operates in the R/W mode, and the NFC I/F of the NFC device operates in the CE mode.

For example, in a case where the NFC I/F 20 of the multi-function apparatus 10 operates as a reader of the R/W mode, the multi-function apparatus 10 is able to use the R/W-CE connection to read data from the NFC device (that is, to obtain data). Further, for example, in a case where the NFC I/F 20 of the multi-function apparatus 10 operates as a writer of the R/W mode, the multi-function apparatus 10 is able to use the R/W-CE connection to write data in the NFC device (that is, to supply data).

As have been described in Case 1 to Case 3, the multi-function apparatus 10 is able to determine which of a P2P connection or an R/W-CE connection is to be established, according to the operation of the NFC device which is the communication partner.

(Login Managing Process of Multi-Function Apparatus 10 (FIG. 3))

Subsequently, with reference to FIG. 3, a login managing process performed by the CPU 32 of the multi-function apparatus 10 will be described. In the login managing process, the CPU 32 repeatedly performs monitoring processes of STEPS S10, S20, and S40.

In STEP S10, the CPU 32 monitors whether an operation for inputting a user ID and a password is performed on the operation unit 12. In a case where the corresponding operation is performed, the CPU 32 determines "YES" in STEP S10 and proceeds to STEP S12. Hereinafter, the user ID input in STEP S10 will be referred to as a target user ID, and the set of the user ID and the password input in STEP S10 will be referred to as a target set, and a user having input the target set will be referred to as a target user.

In STEP S12, the CPU 32 performs authentication on the target set and determines whether the corresponding authentication has succeeded. In a case where it is determined that the target set has not been registered in the authentication table AT ("NO" in STEP S12), the CPU 32 proceeds to STEP S13.

In STEP S13, the CPU 32 performs control such that the display unit 14 displays an error message representing authentication failure, while maintaining the state of the function performing apparatus 10 in a logout state. If STEP S13 finishes, the CPU 32 returns to STEP S10.

In a case where it is determined in STEP S12 that the target set has been registered in the authentication table AT ("YES" in STEP S12), the CPU 32 proceeds to STEP S14.

In STEP S14, the CPU 32 transitions the state of the function performing apparatus 10 from the logout state to a login state corresponding to the target user ID. The logout state is a state where any user including the target user is not permitted to perform at least one of the copying function and the scanning function. The login state corresponding to the target user ID is a state where if at least one of the copy permission information and the scan permission information associated with the target user ID represents "OK", the target user is permitted to perform at least one of the copying function and the scanning function. If STEP S14 finishes, the CPU 32 returns to STEP S10.

In STEP S20, the CPU 32 monitors whether an operation for instructing performance of the copying function or the scanning function (hereinafter, referred to as a function performance operation) is performed on the operation unit 12. In a case where the function performance operation is performed, the CPU 32 determines "YES", and proceeds to STEP S22. Hereinafter, a function instructed by the function performance operation will be referred to as a designated function.

In STEP S22, the CPU 32 determines whether the state of the function performing apparatus 10 is a login state corresponding to any user ID. In a case where it is determined that the state of the function performing apparatus 10 is the logout state ("NO" in STEP S22), the CPU 32 proceeds to STEP S23.

In STEP S23, while maintaining the state of the function performing apparatus 10 in the logout state, the CPU 32 performs control such that the display unit 14 displays an error message representing that it is impossible to perform the designated function since the state of the multi-function apparatus is the logout state. If STEP S23 finishes, the CPU 32 returns to STEP S10.

On the other hand, in a case where the state of the function performing apparatus 10 is a login state ("YES" in STEP S22), the CPU 32 proceeds to STEP S26. Hereinafter, a user ID with respect to which "YES" is determined in STEP S22 (that is, a user ID logging in the multi-function apparatus 10) will be referred to as a target user ID.

In STEP S26, the CPU 32 determines whether it is possible to perform the designated function. Specifically, the CPU 32 obtains the permission information (for example, copy permission information) of the designated function (for example, the copying function) associated with the target user ID, from the authentication table AT. Then, in a case where it is determined that the permission information of the designated function associated with the target user ID represents "N/A" ("NO" in STEP S26), the CPU 32 proceeds to STEP S27.

In STEP S27, the CPU 32 performs control such that the display unit 14 displays an error message representing that it is impossible to perform the designated function since the permission information represents "N/A". If STEP S27 finishes, the CPU 32 proceeds to STEP S32.

On the other hand, in a case where it is determined in STEP S26 that the permission information of the designated function associated with the target user ID represents "OK" ("YES" in STEP S26), the CPU 32 proceeds to STEP S28.

In STEP S28, the CPU 32 performs the designated function. For example, in a case where the designated function is the copying function, the CPU 32 performs control such that the scanning performance unit 18 scans documents. Next, the CPU 32 supplies the scan data to the printing performance unit 16. Therefore, the printing performance unit 16 prints images represented by the scan data, on print media. Further, for example, in a case where the designated function is the scanning function, the CPU 32 performs control such that the scanning performance unit 18 scans documents. Next, the CPU 32 obtains transmission destination information (for example, "IP1") associated with the target user ID, from the authentication table AT. Thereafter, the CPU 32 transmits the scan data through the LAN I/F 22 by use of the obtained transmission destination information. If STEP S28 finishes, the CPU 32 proceeds to STEP S32.

In STEP S32, the CPU 32 transitions the state of the function performing apparatus 10 from the login state corresponding to the target user ID to the logout state. If STEP S32 finishes, the CPU 32 returns to STEP S10.

In STEP S40, the CPU 32 monitors establishment of an NFC connection through the NFC I/F 20. In a case where an OK signal relative to an activation command is received from the NFC device (Case 1 of FIG. 2A or Case 3 of FIG. 2C), or in a case where an OK signal relative to an activation command is transmitted to the NFC device (Case 2 of FIG. 2B), the CPU 32 determines "YES" in STEP S40, and then proceeds to STEP S50 of FIG. 4. Hereinafter, the NFC device having established an NFC connection with the multi-function apparatus 10 will be referred to as a target device.

(Login Managing Process—Continued (FIG. 4))

In STEP S50, the CPU 32 determines whether the established NFC connection is a P2P connection or an R/W-CE connection. In a case where it has been determined in the course of establishing the NFC connection that a P2P connection has to be established (that is, Case 1 of FIG. 2A or Case 2 of FIG. 2B), the CPU 32 determines that the established NFC connection is a P2P connection ("YES" in STEP S50), and then determines that the processes of STEPS S52 to S64 are to be performed.

In STEP S52, the CPU 32 determines whether the state of the function performing apparatus 10 is a login state corresponding to any user ID. In a case where it is determined that the state of the function performing apparatus 10 is the logout state ("NO" in STEP S52), the CPU 32 proceeds to STEP S53.

In STEP S53, while maintaining the state of the function performing apparatus 10 in the logout state, the CPU 32 performs control such that the display unit 14 displays an error message representing that it is impossible to perform the subsequent processes since the state of the multi-function apparatus is the logout state. If STEP S53 finishes, the CPU 32 returns to STEP S10 of FIG. 3.

On the other hand, in a case where it is determined in STEP S52 that the state of the function performing apparatus 10 is a login state ("YES" in STEP S52), the CPU 32 proceeds to STEP S56. Hereinafter, a user ID with respect to which "YES" is determined in STEP S52 (that is, a user ID logging in the multi-function apparatus 10) will be referred to as a target user ID.

In STEP S56, the CPU 32 determines whether any application ID has been obtained from the target device through the NFC I/F 20 (that is, by use of the P2P connection). In a case where the application 98 (see FIG. 1) is active in the target device, an application ID is supplied from the target device to the multi-function apparatus 10. In a case where it is determined that any application ID has not been obtained from the target device ("NO" in STEP S56), the CPU 32 proceeds to STEP S57.

In STEP S57, the CPU 32 performs control such that the display unit 14 displays an error message representing that it is impossible to perform the subsequent processes since any application ID has not been obtained. If STEP S57 finishes, the CPU 32 proceeds to STEP S64.

On the other hand, in a case where it is determined in STEP S56 that an application ID has been obtained from the target device ("YES" in STEP S56), the CPU 32 proceeds to STEP S60.

In STEP S60, the CPU 32 newly generates a device ID. Specifically, the CPU 32 randomly selects alphabets and/or numeric characters, thereby generating a device ID having the predetermined number of characters. The corresponding number of characters is the same as the number of characters of the device ID "D3" (see FIG. 1) of the authentication card AC. In a case where the generated device ID matches with any one device ID having been registered at that moment in the authentication table AT, the CPU 32 regenerates a device ID. Therefore, the CPU 32 is able to generate a unique device ID having not been registered at that moment in the authentication table AT. Thereafter, the CPU 32 registers the generated device ID in association with the target user ID in the authentication table AT.

Incidentally, when the process of STEP S60 starts, if the device ID associated with the target user ID has already been registered in the authentication table AT, in STEP S60, the CPU 32 deletes the registered device ID from the authentication table AT, and registers the generated device ID in association with the target user ID. That is, the CPU 32 registers the generated device ID, instead of the registered device ID, in association with the target user ID.

As described above, according to the present illustrative embodiment, in a case where an application ID is obtained from the target device ("YES" in STEP S56), in STEP S60, the multi-function apparatus 10 generates and registers the device ID in association with the target user ID in the authentication table AT. On the other hand, in a case where any application ID is not obtained from the target device ("NO" in STEP S56), in STEP S57, the CPU 32 does not register the device ID in association with the target user ID. Therefore, in a case where the application 98 for using the multi-function apparatus 10 is not active in the target device, that is, in a case where a P2P connection with the target device is established in a situation where the device ID is not intended to be registered, the multi-function apparatus 10 does not need to register the device ID in the authentication table AT.

Next, in STEP S62, the CPU 32 supplies the generated device ID to the target device through the NFC I/F 20 (that is, by use of the P2P connection). In this way, the CPU 32 is able to assign the generated device ID to the target device. As described above, the CPU 32 assigns the device ID having the same number of characters as the number of characters of the device ID "D3" of the authentication card AC, to the target device. Therefore, the CPU 32 is able to make the target device (for example, the portable terminal PT1) act as an authentication card by assigning a device ID to the target device.

Next, in STEP S64, the CPU 32 transitions the state of the function performing apparatus 10 from the login state corresponding to the target user ID to the logout state. If STEP S64 finishes, the CPU 32 returns to STEP S10.

On the other hand, in a case where it has been determined in STEP S50 that in the course of establishing the NFC connection, an R/W-CE connection has to be established (that is, Case 3 of FIG. 2C), the CPU 32 determines that the established NFC connection is an R/W-CE connection ("NO" in STEP S50), and then determines that the processes of STEPS S70 to S80 are to be performed.

In STEP S70, the CPU 32 obtains a device ID from the target device through the NFC I/F 20 (that is, by use of the R/W-CE connection). Hereinafter, the device ID obtained in STEP S70 will be referred to as a target device ID.

Next, in STEP S72, the CPU 32 determines whether the state of the function performing apparatus 10 is a login state corresponding to any user ID. In a case where it is determined that the state of the function performing apparatus 10 is the login state ("YES" in STEP S72), the CPU 32 proceeds to STEP S74. Hereinafter, a user ID with respect to which "YES" is determined in STEP S72 (that is, a user ID logging in the multi-function apparatus 10) will be referred to as a target user ID.

In STEP S74, the CPU 32 registers the target device ID in association with the target user ID in the authentication table AT.

Next, in STEP S76, the CPU 32 transitions the state of the function performing apparatus 10 from the login state corresponding to the target user ID to the logout state. If STEP S76 finishes, the CPU 32 returns to STEP S10.

On the other hand, in a case where it is determined in STEP S72 that the state of the function performing apparatus 10 is the logout state ("NO" in STEP S72), the CPU 32 proceeds to STEP S78.

In STEP S78, the CPU 32 performs authentication on the target device ID and determines whether the corresponding authentication has succeeded. In a case where it is determined that the target device ID has not been registered in the authentication table AT ("NO" in STEP S78), the CPU 32 proceeds to STEP S79.

In STEP S79, while maintaining the state of the function performing apparatus 10 in the logout state, the CPU 32 performs control such that the display unit 14 displays an error message representing authentication failure. If STEP S79 finishes, the CPU 32 returns to STEP S10.

On the other hand, in a case where it is determined in STEP S78 that the target device ID has been registered in the authentication table AT ("YES" in STEP S78), the CPU 32 proceeds to STEP S80.

In STEP S80, the CPU 32 transitions the state of the function performing apparatus 10 from the logout state to a login state corresponding to the user ID associated with the target device ID. If STEP S80 finishes, the CPU 32 returns to STEP S10.

(Application Process of Portable Terminal PT1 (FIG. 5))

Subsequently, with reference to FIG. 5, an application process which is performed by the CPU 92 of the portable terminal PT1 will be described. Incidentally, similarly to the portable terminal PT1, the portable terminal PT2 performs the process of FIG. 5.

In a case where the user of the portable terminal PT1 wants to store the device ID (see STEP S62 of FIG. 4) assigned from the multi-function apparatus 10, in the portable terminal PT1, the user operates the operation unit 72 and activates the application 98. Also, even in a case where the user wants to log in to the multi-function apparatus 10 by use of the portable terminal PT1 in a state where the device ID has been stored in the portable terminal PT1, the user operates the operation unit 72 and activates the application 98. Upon the application 98 is activated, the CPU 92 of the portable terminal PT1 starts to perform the process of FIG. 5 according to the application 98.

In STEP S100, the CPU 92 determines whether the device ID has been stored in the memory 94. In a case where it is determined that the device ID has not been stored in the memory 94 ("NO" in STEP S100), the CPU 92 proceeds to STEP S102. On the other hand, in a case where it is determined that the device ID has been stored in the memory 94 ("YES" in STEP S100), the CPU 92 proceeds to STEP S120.

In STEP S102, the CPU 92 issues an instruction to the NFC I/F 80 such that the NFC I/F 80 operates only in the P2P mode. Therefore, the NFC I/F 80 does not operate in the R/W mode and the CE mode, and operates in the P2P connection.

Next, in STEP S104, the CPU 92 performs control such that the display unit 74 displays a message for prompting the user to log in to the multi-function apparatus 10 and a message for prompting the user to bring the portable terminal PT1 close to the multi-function apparatus 10 after logging in to the multi-function apparatus 10. According to the messages, the user inputs the user ID and the password to the multi-function apparatus 10 and logs in to the multi-function apparatus 10 (see STEP S14 in case of "YES" in STEP S10 and "YES" in STEP S12 in FIG. 3). Thereafter, the user brings the portable terminal PT1 close to the multi-function apparatus 10. Then, the distance between the NFC I/F 80 of the portable terminal PT1 and the NFC I/F 20 of the multi-function apparatus 10 becomes shorter than the distance (for example, 10 cm) within which the NFC communication is possible. As a result, an NFC connection is established between the NFC I/F 80 and the NFC I/F 20.

In a case where an NFC connection is established, the CPU 92 determines "YES" in STEP S106, and then proceeds to STEP S108. Since the NFC I/F 80 of the portable terminal PT1 is operating only in the P2P mode (see STEP S102), as shown in Case 1 of FIG. 2A or Case 2 of FIG. 2B, a P2P connection is established.

In STEP S108, the CPU 92 obtains a device ID from the multi-function apparatus 10 (see STEP S62 of FIG. 4) through the NFC I/F 80 (that is, by use of the P2P connection).

Next, in STEP S110, the CPU 92 stores the obtained device ID in the memory 94. As a result, it becomes possible to use the portable terminal PT1 to log in to the multi-function apparatus 10. If STEP S110 finishes, the process of FIG. 5 finishes.

On the other hand, in STEP S120 (that is, in a case where the device ID has been stored), the CPU 92 issues an instruction to the NFC I/F 80 such that the NFC I/F 80 operates only in the CE mode. As a result, the NFC I/F 80 does not operate in the P2P mode and the R/W mode, and operates in the CE mode.

Next, in STEP S122, the CPU 92 performs control such that the display unit 74 displays a message for prompting the user to bring the portable terminal PT1 close to the multi-function apparatus 10. According thereto, the user brings the portable terminal PT1 close to the multi-function apparatus 10. As a result, an NFC connection is established between the NFC I/F 80 of the portable terminal PT1 and the NFC I/F 20 of the multi-function apparatus 10.

In a case where the NFC connection is established, the CPU 92 determines "YES" in STEP S124 and then proceeds to STEP S126. Since the NFC I/F 80 of the portable terminal PT1 is operating only in the CE mode (see STEP S120), as shown in Case 3 of FIG. 2C, an R/W-CE connection is established.

Figure 4:
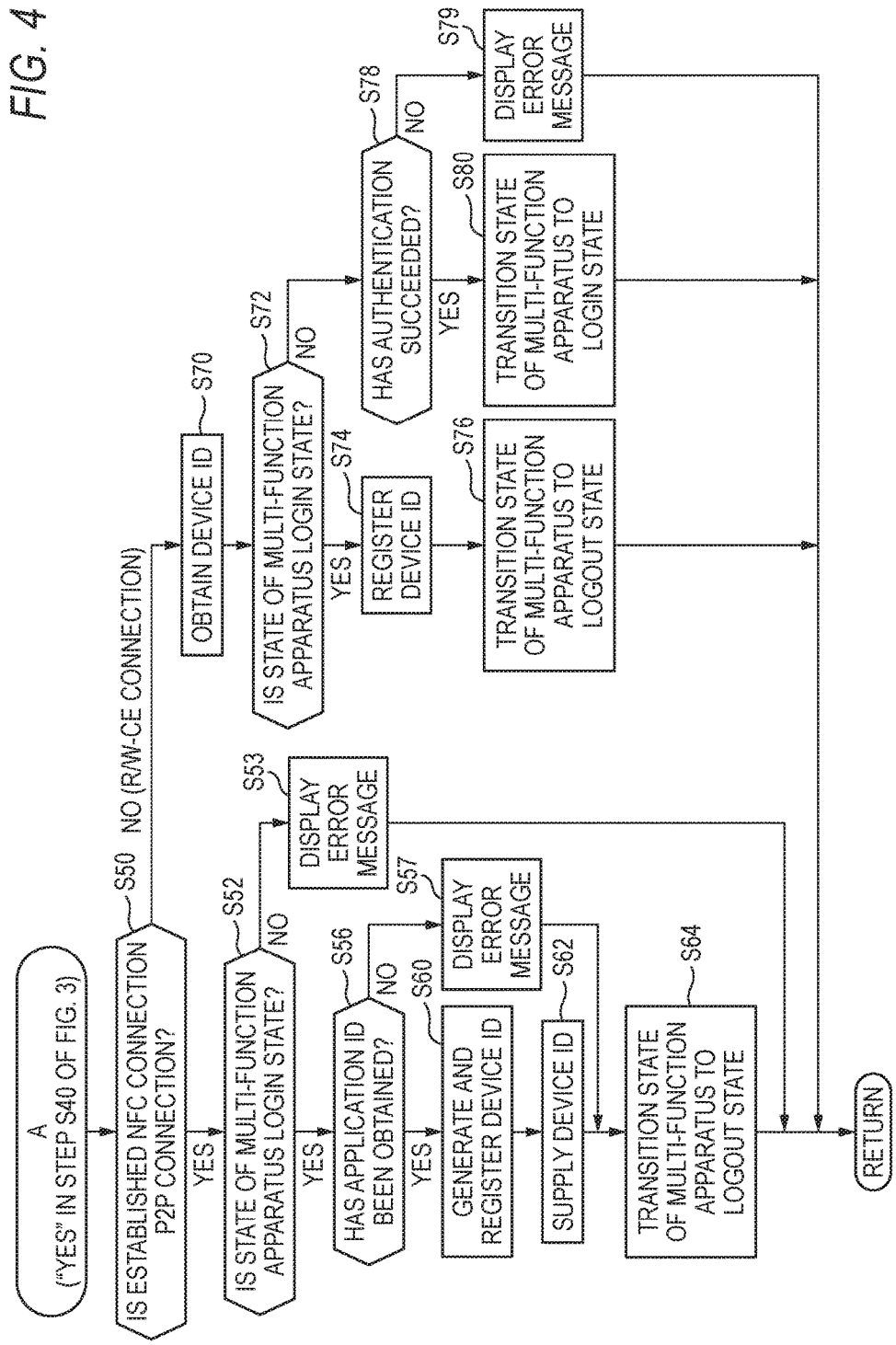
FIG. 4 is a flow chart subsequent to FIG. 3.

In STEP S126, the CPU 92 supplies the device ID stored in the memory 94, to the multi-function apparatus 10 through the NFC I/F 80 (that is, by use of the R/W-CE connection) (see STEP S70 of FIG. 4). As a result, logging in to the multi-function apparatus 10 is implemented (see STEP S80 of FIG. 4). If STEP S126 finishes, the process of FIG. 5 finishes.

(Case A (FIG. 6))

Subsequently, specific cases which are implemented according to the flow charts of FIGS. 5 to 5 will be described. First, with reference to FIG. 6, Case A which is implemented by the multi-function apparatus 10 and the portable terminal PT1 will be described.

Figure 6B:
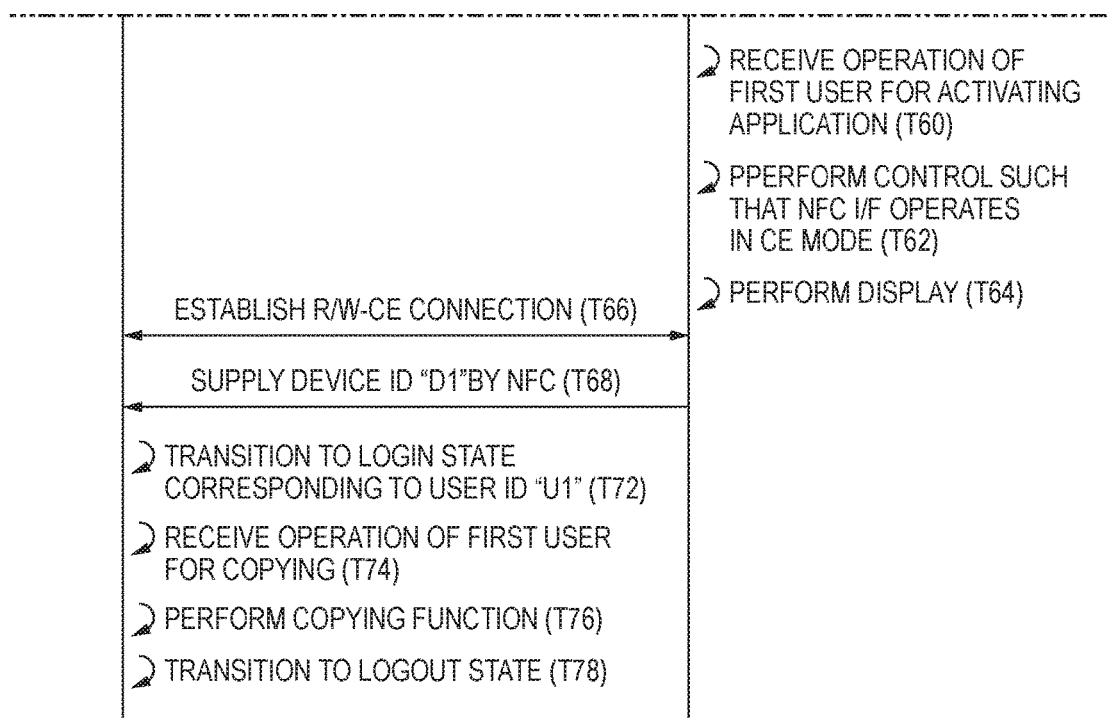

In the initial state of Case A of FIG. 6, in the authentication table AT of the multi-function apparatus 10, there has been registered a combination information item including a user ID "U1", a password "P1", copy permission information "OK", and scan permission information "N/A" as shown in FIG. 1. However, in the authentication table AT, any device ID has not been registered in association with the user ID "U1" and the password "P1". Also, in the memory 94 of the portable terminal PT1, any device ID has not been stored.

The administrator of the communication system 2 has notified the user ID "U1" and the password "P1" to the user (hereinafter, referred to as a first user) of the portable terminal PT1. Therefore, in STEP T10, the first user can operate the operation unit 12 of the multi-function apparatus 10 and input the set of the user ID "U1" and the password "P1" ("YES" in STEP S10 of FIG. 3). In this case, in STEP T12, the multi-function apparatus 10 determines that the input set has been registered in the authentication table AT ("YES" in STEP S12). Then, in STEP S14, the multi-function apparatus 10 transitions to a login state corresponding to the user ID "U1".

In STEP T14, the first user performs a function performance operation for the copying function on the operation unit 12 of the multi-function apparatus 10 ("YES" in STEP S20 of FIG. 3). In this case, in STEP T16, the multi-function apparatus 10 determines that the state of the multi-function apparatus is a login state corresponding to the user ID "U1" ("YES" in STEP S22), and determines that the copy permission information associated with the user ID "U1" is "OK" ("YES" in STEP S26), and then performs the copying function (STEP S28). Thereafter, in STEP T18, the multi-function apparatus 10 transitions to the logout state (STEP S32).

The first user wants to store a device ID assigned from the multi-function apparatus 10, in the portable terminal PT1. Therefore, in STEP T20, the first user operates the operation unit 72 of the portable terminal PT1 and activates the application 98 (the trigger of the process of FIG. 5). In this case, in STEP T22, the portable terminal PT1 performs control such that the NFC I/F 80 operates only in the P2P mode (STEP S102 after "NO" in STEP S100). Thereafter, in STEP T24, the portable terminal PT1 displays a message for prompting the user to log in to the multi-function apparatus 10 and a message for prompting the user to bring the portable terminal PT1 close to the multi-function apparatus 10 (STEP S104).

In STEP T30, the first user operates the operation unit 12 of the multi-function apparatus 10 and inputs the set of the user ID "U1" and the password "P1" ("YES" in STEP S10 of FIG. 3). In this case, in STEP T32, the multi-function apparatus 10 determines that the input set has been registered in the authentication table AT ("YES" in STEP S12). Then, in STEP S14, the multi-function apparatus 10 transitions to a login state corresponding to the user ID "U1".

Figure 5:
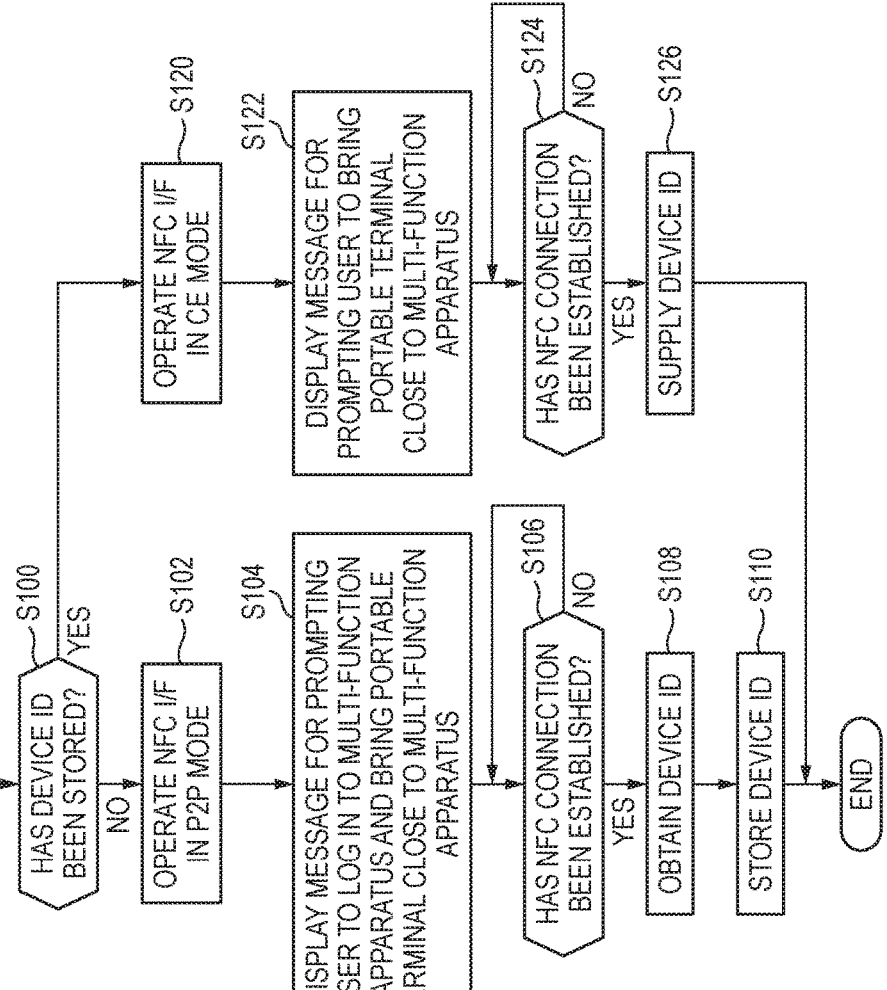
FIG. 5 is a flow chart illustrating an application process of a portable terminal.

In STEP T34, if the first user brings the portable terminal PT1 close to the multi-function apparatus 10, a P2P connection is established between the multi-function apparatus 10 and the portable terminal PT1 ("YES" in STEP S40 of FIG. 3, "YES" in STEP S50 of FIG. 4, and "YES" in STEP S106 of FIG. 5). In this case, in STEP T36, the multi-function apparatus 10 newly generates a device ID "D1" and registers the device ID "D1" in association with the user ID "U1" and the password "P1" in the authentication table AT (STEP S60 of FIG. 4). Thereafter, in STEP T38, the multi-function apparatus 10 supplies the device ID "D1" to the portable terminal PT1 (STEP S62). Next, in STEP T40, the multi-function apparatus 10 transitions to the logout state (STEP S64).

In STEP T38, the portable terminal PT1 obtains the device ID "D1" from the multi-function apparatus 10 (STEP S108 of FIG. 5). Thereafter, in STEP T50, the portable terminal PT1 stores the device ID "D1" (STEP S110).

After the portable terminal PT1 stores the device ID "D1", the first user wants to log in to the multi-function apparatus 10 by use of the portable terminal PT1. Therefore, in STEP T60, the first user operates the operation unit 72 of the portable terminal PT1 and activates the application 98 (the trigger of the process of FIG. 5). In this case, in STEP T62, the portable terminal PT1 performs control such that the NFC I/F 80 operates only in the CE mode (STEP S120 after "YES" in STEP S100). Thereafter, in STEP T64, the portable terminal PT1 displays a message for prompting the user to bring the portable terminal PT1 close to the multi-function apparatus 10 (STEP S122).

In STEP T66, if the first user brings the portable terminal PT1 close to the multi-function apparatus 10, an R/W-CE connection is established between the multi-function apparatus 10 and the portable terminal PT1 ("YES" in STEP S40 of FIG. 3, "NO" in STEP S50 of FIG. 4, and "YES" in STEP S124 of FIG. 5). In this case, in STEP T68, the portable terminal PT1 supplies the device ID "D1" to the multi-function apparatus 10 (STEP S126).

In STEP T68, the multi-function apparatus 10 obtains the device ID "D1" from the portable terminal PT1 (STEP S70 of FIG. 4). Next, in STEP T72, the multi-function apparatus 10 determines that the state of the multi-function apparatus 10 is the logout state ("NO" in STEP S72), and determines that the device ID "D1" has been registered in the authentication table AT ("YES" in STEP S78), and then transitions to a login state corresponding to the user ID "U1" associated with the device ID "D1" (STEP S80).

In STEP T74, the first user performs a function performance operation for the copying function on the operation unit 12 of the multi-function apparatus 10 ("YES" in STEP S20 of FIG. 3). In this case, in STEP T76, the multi-function apparatus 10 determines that the state of the multi-function apparatus is a login state corresponding to the user ID "U1" ("YES" in STEP S22), determines that the copy permission information associated with the user ID "U1" is "OK" ("YES" in STEP S26), and then performs the copying function (STEP S28). Thereafter, in STEP T78, the multi-function apparatus 10 transitions to the logout state (STEP S72).

(Advantages of Case A)

As described above, in a case where the first user operates the operation unit 12 and inputs the user ID "U1" and the password "P1" to the multi-function apparatus 10 (STEP T10), the multi-function apparatus 10 transitions the state of the function performing apparatus 10 to the login state corresponding to the user ID "U1" (STEP T12). Therefore, the first user can make the multi-function apparatus 10 perform the copying function (STEPS T14 and T16). Further, when the state of the function performing apparatus 10 is a login state corresponding to the user ID "U1", in a case where a P2P connection with the portable terminal PT1 is established (STEP T34), the multi-function apparatus 10 generates the device ID "D1" and registers the device ID "D1" in the authentication table AT, in association with the user ID "U1" and the password "P1" (STEP T36). Thereafter, the multi-function apparatus 10 supplies the device ID "D1" to the portable terminal PT1 (STEP T38). As described above, even if any device ID has not been stored in the portable terminal PT1 in advance, the multi-function apparatus 10 is able to assign the device ID "D1" to the portable terminal PT1 such that the portable terminal PT1 acts as an authentication card. That is, the portable terminal PT1 is able to obtain the device ID "D1" from the multi-function apparatus 10 (STEP T38) and store the device ID "D1" (STEP T50). Therefore, the portable terminal PT1 is able to act as an authentication card and is able to supply the device ID "D1" to the multi-function apparatus 10 (STEP T68), thereby causing the state of the function performing apparatus 10 to transition to a login state corresponding to the user ID "U1" (STEP T72) associated with the device ID "D1." In other words, in a case of obtaining the device ID "D1" from the portable terminal PT1 (STEP T68), the multi-function apparatus 10 is able to transition the state of the function performing apparatus 10 to a login state corresponding to the user ID "U1" (STEP T72). Therefore, the first user can make the multi-function apparatus 10 perform the copying function (STEPS T74 and T76). According to the present illustrative embodiment, the first user can use the portable terminal PT1, in which any device ID has not been stored in advance, to make the multi-function apparatus 10 perform a desired function.

Further, as described above, the NFC I/F (not shown) of the authentication card AC operates as an NFC standard card (that is, like in the CE mode). Then, in a case of obtaining a device ID from the authentication card AC by use of an R/W-CE connection with the authentication card AC (STEP S70 of FIG. 4), the multi-function apparatus 10 performs an authentication process (STEP S78). According to this operation of the authentication card AC, the portable terminal PT1 performs control such that the NFC I/F 80 operates only in the CE mode (STEP T62 of FIG. 6), in a case where the device ID "D1" has been stored in the memory 94, that is, in a case where the portable terminal PT1 is to act as an authentication card. As a result, in a case of obtaining the device ID "D1" from the portable terminal PT1 by use of an R/W-CE connection with the portable terminal PT1 (STEP T68, or STEP S70 of FIG. 4), the multi-function apparatus 10 performs an authentication process (STEP T72 or STEP S78 of FIG. 4). That is, according to the present illustrative embodiment, since the operation of the NFC I/F of the authentication card AC and the operation of the NFC I/F 80 of the portable terminal PT1 which are to act as an authentication card are the same as each other, if an R/W-CE connection with any one of the authentication card AC and the portable terminal PT1 is established, the multi-function apparatus 10 is able to appropriately perform an authentication process.

Further, in a case where the device ID "D1" has not been stored in the memory 94, that is, in a case where the portable terminal PT1 is to obtain the device ID "D1" from the multi-function apparatus 10, the portable terminal PT1 performs control such that the NFC I/F 80 operates only in the P2P mode (STEP T22). As a result, in a case where the P2P connection with the portable terminal PT1 is established (STEP T34), the multi-function apparatus 10 generates and registers the device ID "D1" (STEP T36) and supplies the device ID "D1" to the portable terminal PT1 (STEP T38). As described above, according to the present illustrative embodiment, the multi-function apparatus 10 is able to perform an appropriate process according to the kind of a connection (a P2P connection or an R/W-CE connection) which is established between the multi-function apparatus 10 and the portable terminal PT1.

(Case B (FIG. 7))

Subsequently, with reference to FIG. 7, Case B which is implemented by the multi-function apparatus 10 and the portable terminal PT2 after the multi-function apparatus 10 assigns the device ID "D1" to the portable terminal PT1 will be described. In the authentication table AT of the multi-function apparatus 10, there has been registered the device ID "D1" in association with the user ID "U1" and the password "P1".

The first user wants to log in to the multi-function apparatus 10 by use of the portable terminal PT2, instead of the portable terminal PT1. In this case, in STEP T120, the first user operates the operation unit (not shown) of the portable terminal PT2 and activates an application (that is, the same application as the application 98 of FIG. 1) (the trigger of the process of FIG. 5). The subsequent STEPS T122 to T134 are the same as STEPS T22 to T34 of FIG. 6 except that the portable terminal PT2 is used instead of the portable terminal PT1.

In STEP T136, the multi-function apparatus 10 newly generates a device ID "D2" and registers the device ID "D2", in place of the device ID "D1", in the authentication table AT in association with the user ID "U1" and the password "P1" (STEP S60 of FIG. 4). Therefore, in the authentication table AT, in place of the device ID "D1" assigned to the portable terminal PT1, the device ID "D2" assigned to the portable terminal PT2 is registered. The subsequent STEPS T138 to T178 are the same as STEPS T38 to T78 of FIG. 6, except that the portable terminal PT2 is used instead of the portable terminal PT1, and that the device ID "D2" is used instead of the device ID "D1".

(Advantages of Case B)

As described above, in a case where the first user wants to use the portable terminal PT2 instead of the portable terminal PT1, the multi-function apparatus 10 is able to register the device ID "D2", instead of the device ID "D1", in the authentication table AT (STEP T136), and supply the device ID "D2" to the portable terminal PT2 (STEP T138). Therefore, the first user can log in to the multi-function apparatus 10 by use of the portable terminal PT2 instead of the portable terminal PT1 (STEPS T160 to T172), thereby capable of making the multi-function apparatus 10 perform a desired function (STEPS T174 and T176).

(Case C (FIG. 8))

Subsequently, with reference to FIG. 8, Case C which is implemented by the multi-function apparatus 10 and the authentication card AC will be described.

In the initial state of Case C of FIG. 8, in the authentication table AT of the multi-function apparatus 10, there has been registered a combination information item including a user ID "U2", a password "P2", copy permission information "N/A", scan permission information "OK", and transmission destination information "IP1" as shown in FIG. 1. However, in the authentication table AT, any device ID has not been registered in association with the user ID "U2" and the password "P2". The authentication card AC has the device ID "D3" stored therein in advance.

The administrator of the communication system 2 has provided a second user with the authentication card AC. Also, the administrator has notified the user ID "U2" and the password "P2" to the second user. Therefore, in STEP T210, the second user can operate the operation unit 12 of the multi-function apparatus 10 and input the set of the user ID "U2" and the password "P2" ("YES" in STEP S10 of FIG. 3). In a case, in STEP T212, the multi-function apparatus 10 determines that the input set has been registered in the authentication table AT ("YES" in STEP S12). Then, in STEP S14, the multi-function apparatus 10 transitions to a login state corresponding to the user ID "U2".

In STEP T214, the second user performs a function performance operation for the scanning function on the operation unit 12 of the multi-function apparatus 10 ("YES" in STEP S20 of FIG. 3). In this case, in STEP T216, the multi-function apparatus 10 determines that the state of the multi-function apparatus is a login state corresponding to the user ID "U2" ("YES" in STEP S22), determines that the copy permission information associated with the user ID "U2" is "OK" ("YES" in STEP S26), and then performs the scanning function (STEP S28). Thereafter, in STEP T218, the multi-function apparatus 10 transitions to the logout state (STEP S32).

The second user wants to register the device ID "D3" of the authentication card AC in the authentication table AT of the multi-function apparatus 10. Therefore, in STEP T230, the second user operates the operation unit 12 of the multi-function apparatus 10 and inputs the set of the user ID "U2" and the password "P2" ("YES" in STEP S10 of FIG. 3). In this case, in STEP T232, the multi-function apparatus 10 determines that the input set has been registered in the authentication table AT ("YES" in STEP S12). Then, the multi-function apparatus 10 transitions to a login state corresponding to the user ID "U2" (STEP S14).

In STEP T234, if the second user brings the authentication card AC close to the multi-function apparatus 10, an R/W-CE connection is established between the multi-function apparatus 10 and the authentication card AC ("YES" in STEP S40 and "NO" in STEP S50). In this case, in STEP T236, the multi-function apparatus 10 obtains the device ID "D3" from the authentication card AC (STEP S70). Then, in STEP T238, the multi-function apparatus 10 determines that the state of the multi-function apparatus 10 is a login state corresponding to the user ID "U2" ("YES" in STEP S72), and registers the device ID "D3" in the authentication table AT, in association with the user ID "U2" and the password "P2" (STEP S72). Next, in STEP S240, the multi-function apparatus 10 transitions to the logout state (STEP S76).

The second user wants to log in to the multi-function apparatus 10 by use of the authentication card AC. In STEP T266, if the second user brings the authentication card AC close to the multi-function apparatus 10, an R/W-CE connection is established between the multi-function apparatus 10 and the authentication card AC ("YES" in STEP S40 of FIG. 3 and "NO" in STEP S50 of FIG. 4). In this case, in STEP T268, the multi-function apparatus 10 obtains the device ID "D3" from the authentication card AC (STEP S70). Next, in STEP T272, the multi-function apparatus 10 determines that the state of the multi-function apparatus is the logout state ("NO" in STEP S72), determines that the device ID "D3" has been registered in the authentication table AT ("YES" in STEP S78), and then transitions to a login state corresponding to the user ID "U2" associated with the device ID "D3" (STEP S80). The subsequent STEPS T274 to T278 are the same as STEPS T214 to T218.

(Advantages of Case C)

When the state of the function performing apparatus 10 is a login state corresponding to the user ID "U2", in a case where the multi-function apparatus 10 obtains the device ID "D3" from the authentication card AC (STEP T236), the multi-function apparatus 10 registers the device ID "D3" in the authentication table AT, in association with the user ID "U2" and the password "P2" (STEP T238). Thereafter, when the state of the function performing apparatus 10 is the logout state, in a case where the multi-function apparatus 10 obtains the device ID "D3" from the authentication card AC (STEP T268), the multi-function apparatus 10 transitions the state of the function performing apparatus 10 to a login state corresponding to the user ID "U2" (STEP T272). Therefore, the second user can log in to the multi-function apparatus 10 by use of the authentication card AC and can make the multi-function apparatus 10 perform a desired function (STEPS T274 and T276).

Further, according to the present illustrative embodiment, in a case where the second user wants to register the device ID "D3" of the authentication card AC in the authentication table AT of the multi-function apparatus 10, the second user needs only to bring the authentication card AC close to the multi-function apparatus 10. That is, in order to register the device ID "D3" in the authentication table AT, the second user (or the administrator of the communication system 2) does not need, for example, to operate the operation unit 12 of the multi-function apparatus 10, or to access the multi-function apparatus 10 by use of a PC or the like. Therefore, convenience for users is high.

The multi-function apparatus 10 and the portable terminal PT1 are examples of the function performing apparatus and the portable device, respectively. The portable terminal PT1, the portable terminal PT2, and the authentication card AC are examples of a first portable device, a second portable device, and a third portable device, respectively. At least one of the copying function and the scanning function is an example of the specific function. The printing performance unit 16 and the scanning performance unit 18 are examples of a function performing unit. The authentication table AT is an example of an authentication memory. The NFC I/F 20 and the NFC I/F 80 are examples of an apparatus interface and a device interface, respectively. The application ID is an example of predetermined application information. The P2P mode and the R/W mode are examples of a first mode and a second mode, respectively. The P2P mode and the CE mode are examples of a third mode and a fourth mode, respectively. The processes of STEPS S60 and S62 are an example of a first kind process, and the process of STEP S80 is an example of a second kind process.

In Case A of FIG. 6, the user ID "U1" and the password "P1" are an example of first user authentication information. The device ID "D1" is an example of first device authentication information. The logout state and the login state corresponding to the user ID "U1" are examples of a first non-permission state and a first permission state, respectively. The P2P connection of STEP T34 and the R/W-CE connection of STEP T66 are examples of a first connection and a second connection, respectively.

Figure 7:
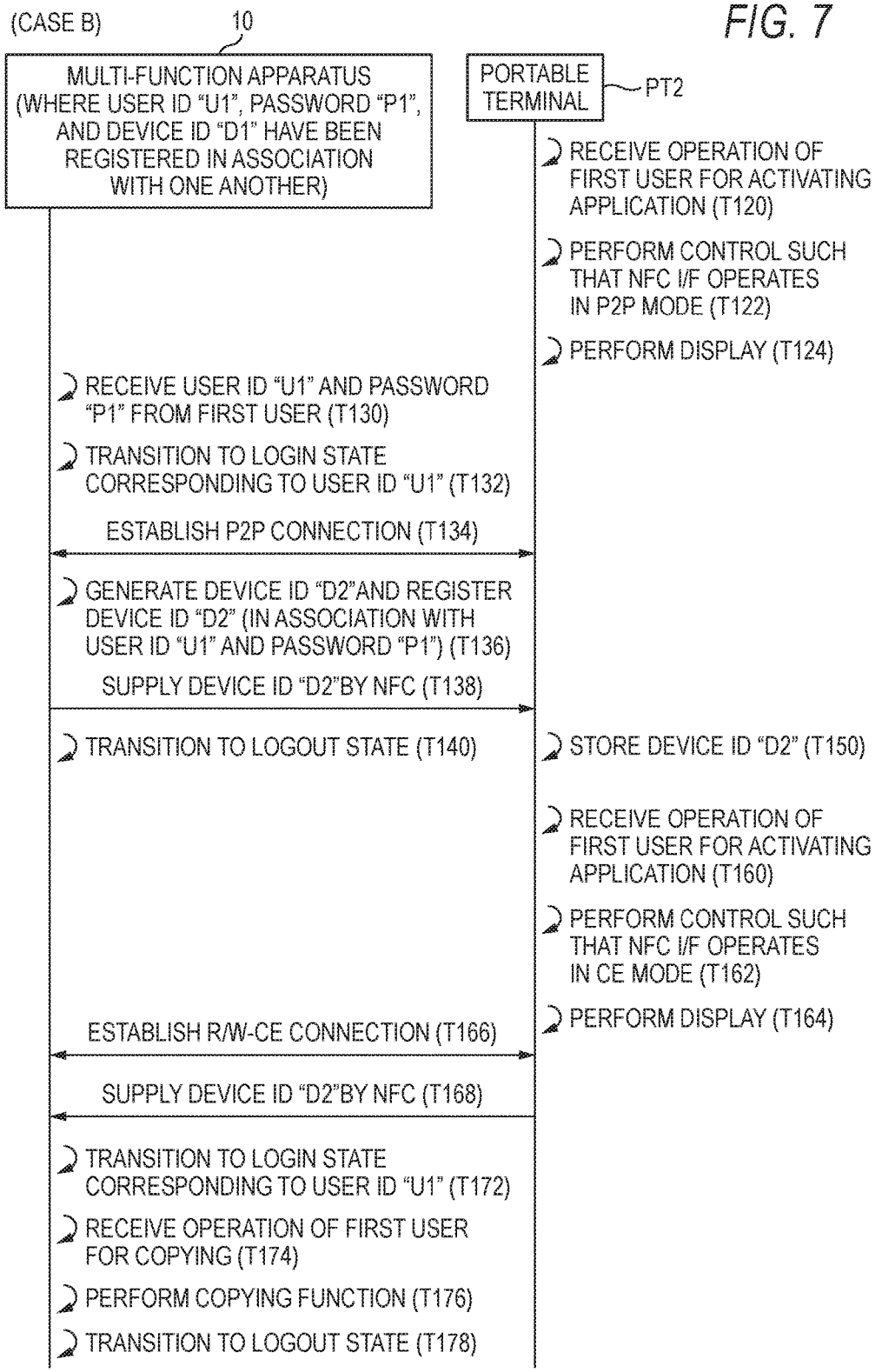
FIG. 7 is a sequence diagram processes which are performed by the multi-function apparatus and another portable terminal.

In Case B of FIG. 7, the device ID "D2" is an example of second device authentication information. The P2P connection of STEP T134 and the R/W-CE connection of STEP T166 are examples of a third connection and a fourth connection, respectively.

In Case C of FIG. 8, the user ID "U2" and the password "P2" are an example of second user authentication information. The device ID "D3" is an example of third device authentication information. The logout state and the login state corresponding to the user ID "U2" are examples of a second non-permission state and a second permission state, respectively. The R/W-CE connection of STEP T234 and the R/W-CE connection of STEP T266 are examples of a fifth connection and a sixth connection, respectively.

Modifications to Illustrative Embodiments

Although specific examples of the present invention have been described, they are merely illustrative and do not limit the scope of claims. In technologies to be described in claims, examples obtained by changing or modifying the above-described specific examples are included. Modifications to the above-described illustrative embodiment will be listed below.

(Modification 1)

In the above-described illustrative embodiment, when the state of the multi-function apparatus 10 is a login state, in a case where a P2P connection with the portable terminal PT1 is established ("YES" in STEP S50, and "YES" in STEP S52 in FIG. 4), the CPU 32 of the multi-function apparatus 10 generates and registers a device ID (STEP S60). Alternatively, when the state of the multi-function apparatus 10 is the logout state, in a case where a P2P connection with the portable terminal PT1 is established, the CPU 32 may prompt the user to input the user ID and the password. Then, in a case where the user inputs the user ID and the password, the CPU 32 may generate and register a device ID. In general, regardless of whether the state of the function performing apparatus is the first permission state, a registering unit may register the first device authentication information in a case where the first connection is established.

(Modification 2)

In the above-described illustrative embodiment, in a case where a P2P connection with the portable terminal PT1 is established ("YES" in STEP S50 of FIG. 4), the CPU 32 of the multi-function apparatus 10 generates a device ID (STEP S60). Alternatively, the CPU 32 may generate an unique device ID in advance before a P2P connection with the portable terminal PT1 is established, and register the generated device ID in a case where a P2P connection with the portable terminal PT1 is established. In general, the registering unit may generate the first device authentication information before the first connection is established, or may generate the first device authentication information after the first connection is established.

(Modification 3)

In the above-described illustrative embodiment, in a case where an application ID is obtained from the portable terminal PT1 ("YES" in STEP S56 of FIG. 4), the CPU 32 of the multi-function apparatus 10 generates and registers a device ID (STEP S60). Alternatively, regardless of whether an application ID is obtained from the portable terminal PT1 (that is, regardless of the result of STEP S56), the CPU 32 may generate and register a device ID. In general, in a case where the first connection is established, regardless of whether the predetermined application information is obtained, the registering unit may register the first device authentication information.

(Modification 4)

In the above-described illustrative embodiment, the CPU 32 of the multi-function apparatus 10 is able to perform the process of registering the device ID "D3" of the authentication card AC (STEPS S74 and S76 of FIG. 4). Alternatively, the CPU 32 may be unable to perform the process of registering the device ID "D3" of the authentication card AC. For example, the administrator of the communication system 2 may operate the operation unit 12 of the multi-function apparatus 10 and register the device ID "D3" of the authentication card AC in the authentication table AT. In general, the registering unit may be unable to perform a process of registering the third device authentication information in association with the second user authentication information.

(Modification 5)

In the above-described illustrative embodiment, when the state of the multi-function apparatus 10 is a login state, in a case where a function performance operation is performed on the operation unit 12 ("YES" in STEP S20 and "YES" in STEP S22 in FIG. 3), the CPU 32 of the multi-function apparatus 10 performs a designated function (STEP S28). Alternatively, for example, when the state of the multi-function apparatus is the logout state, in a case where a function performance operation is performed, the CPU 32 may prompt the user to perform login. Thereafter, if the user performs an operation for login (for example, input of the user ID and the password), whereby the multi-function apparatus transitions to a login state, the CPU 32 may perform a designated function. In general, when the state of the function performing apparatus is the first permission state, in a case where an instruction for using the specific function is input, a function performance unit may perform the specific function; and when the state of the function performing apparatus is the first non-permission state, in a case where an instruction for using the specific function is input and then the state of the function performing apparatus transitions to the first permission state, the function performance unit may perform the specific function.

(Modification 6)

For example, in FIG. 5, in a case where a device ID has been stored in the memory 94 ("YES" in STEP S100), the CPU 92 of the portable terminal PT1 may perform control such that the NFC I/F 80 operates only in the P2P mode. On the other hand, in a case where any device ID has not been stored in the memory 94 ("NO" in STEP S100), the CPU 92 may perform control such that the NFC I/F 80 operates only in the CE mode. Further, in a case where an R/W-CE connection with the multi-function apparatus 10 is established, the CPU 92 may obtain a device ID from the multi-function apparatus 10, and store the device ID in the memory 94. Further, in a case where a P2P connection with the multi-function apparatus 10 is established, the CPU 92 may supply the device ID to the multi-function apparatus 10, thereby causing the state of the multi-function apparatus 10 to transition to the login state. Further, in a case where an R/W-CE connection with the portable terminal PT1, the CPU 32 of the multi-function apparatus 10 may register the device ID and supply the corresponding device ID to the portable terminal PT1. Further, in a case where a P2P connection with the portable terminal PT1 is established, the CPU 32 may obtain a device ID from the portable terminal PT1 and transition the state of the multi-function apparatus 10 to a login state. In the present modification, the R/W mode and the P2P mode are examples of the first mode and the second mode, respectively. The CE mode and the P2P mode are examples of the third mode and the fourth mode, respectively. Incidentally, the first the fourth modes are not limited to the modes of the above-described illustrative embodiment and the present modification. For example, in a case where the NFC I/F 20 of the multi-function apparatus 10 can operate not only in the P2P mode and the R/W mode but also in the CE mode, the following modifications can be used. For example, the P2P mode and the CE mode may be examples of the first mode and the second mode, respectively, and the P2P mode and the R/W mode may be examples of the third mode and the fourth mode, respectively. Further, for example, the CE mode and the P2P mode may be examples of the first mode and the second mode, respectively, and the R/W mode and the P2P mode may be examples of the third mode and the fourth mode, respectively. Further, for example, the R/W mode and the CE mode may be examples of the first mode and the second mode, respectively, and the CE mode and the R/W mode may be examples of the third mode and the fourth mode, respectively. For example, the CE mode and the R/W mode may be examples of the first mode and the second mode, respectively, and the R/W mode and the CE mode may be examples of the third mode and the fourth mode, respectively.

(Modification 7)

In the above-described illustrative embodiment, a mode (that is, the P2P mode) in which the NFC I/F 20 of the multi-function apparatus 10 operates during the first connection is different from a mode (that is, the R/W mode) in which the NFC I/F 20 operates during the second connection. Further, a mode (that is, the P2P mode) in which the NFC I/F 80 of the portable terminal PT1 operates during the first connection is different from a mode (that is, the CE mode) in which the NFC I/F 80 operates during the second connection. Alternatively, a mode in which the NFC I/F 20 of the multi-function apparatus 10 operates during the first connection, and a mode in which the NFC I/F 20 operates during the second connection may be the same (for example, the P2P mode). Similarly, a mode in which the NFC I/F 80 of the portable terminal PT1 operates during the first connection, and a mode in which the NFC I/F 80 operates during the second connection may be the same.

(Modification 8)

For example, the portable terminal PT1 may store a device ID "D1" in the memory 94 in advance. That is, in a state where the device ID "D1" has not been registered in the authentication table AT of the multi-function apparatus 10, for example, the user may input the device ID "D1" to the portable terminal PT1 and assign the device ID "D1" to the portable terminal PT1. In this case, the CPU 32 of the multi-function apparatus 10 may obtain the device ID "D1" from the portable terminal PT1 and register the device ID "D1" in the authentication table AT, similarly in a case of registering the device ID "D3" of the authentication card AC in the authentication table AT in the Case C of FIG. 8. In the present modification, the portable terminal PT1 is an example of the third portable device.

(Modification 9)

The operation unit 12 and the display unit 14 of the multi-function apparatus 10 may be a so-called touch panel. That is, the operation unit 12 and the display unit 14 of the multi-function apparatus 10 may be implemented by pieces of hardware configured separately, like in the above-described illustrative embodiment, or may be implemented by a piece of hardware configured integrally, like in the present modification. Similarly, the operation unit 72 and the display unit 74 of the portable terminal PT1 may be implemented by pieces of hardware configured separately, or may be implemented by a piece of hardware configured integrally.

(Modification 10)

The authentication table AT may not be stored in the memory 34 of the multi-function apparatus 10, and may be stored a specific device (for example, a server) which is configured separately from the multi-function apparatus 10. In this case, for example, in a case of performing STEP S12 or S26 of FIG. 3, or S60, S74, or S78 of FIG. 4, the CPU 32 of the multi-function apparatus 10 may perform communication with the specific device and access to the authentication table AT stored in the specific device. In general, the authentication memory may be inside the function performing apparatus, or may be outside the function performing apparatus.

(Modification 11)

The multi-function apparatus 10 and the portable terminal PT1 may have I/Fs for performing any other kind of near field communication, such as TransferJet (registered as a trade mark), Bluetooth (registered as a trade mark), or infrared communication, instead of the NFC I/Fs 20 and 80. That is, the apparatus interface and the device interface are not limited to NFC I/Fs, and may be other kinds of I/Fs.

(Modification 12)

The function performing apparatus is not limited to the multi-function apparatus 10, and may be a printer capable of performing only a printing function, or may be a scanner capable of performing only a scanning function, or may be a telephone capable of performing a telephone function, or may be a facsimile capable of a facsimileing function, or may be a PC or the like performing a communication function. That is, the specific function is not limited to the copying function and the scanning function, and may be any other function.

(Modification 13)

In the above-described illustrative embodiment, the individual processes of FIGS. 3 to 5 are implemented by software (that is, the programs 36 and 98). However, at least one of the individual processes of FIGS. 3 to 5 may be implemented by hardware such as logic circuits.

Further, the technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

What is claimed is:

1. An authentication system comprising:
a function performing apparatus; and
a first portable device that is separate from the function performing apparatus,
wherein the function performing apparatus comprises:
a first processor; and
first memory storing first computer-readable instructions therein, the first computer-readable instructions, when executed by the first processor, causing the function performing apparatus to perform:
receiving, through an operation device, first user authentication information while the function performing apparatus is in a first non-permission state in which a specific function is not permitted to be used by a first user, wherein the first user authentication information is information for authenticating the first user;
in response to receiving the first user authentication information while the first user authentication information is registered in an authentication memory, transitioning the function performing apparatus from the first non-permission state to a first permission state in which the specific function is permitted to be used by the first user;
establishing a first connection with the first portable device while the function performing apparatus is in the first permission state;
specifying first device authentication information in response to the first connection being established, wherein the first device authentication information is information for authenticating the first portable device;
registering, in the authentication memory, the specified first device authentication information in association with the first user authentication information in response to the first device authentication information being specified;
establishing a second connection with the first portable device while the function performing apparatus is in the first non-permission state and after the first device authentication information is specified;
obtaining, from the first portable device, the first device authentication information in response to the second connection being established; and
in response to the first device authentication information being obtained from the first portable device while the first device authentication information is registered in the authentication memory, transitioning the function performing apparatus from the first non-permission state in which the specific function is not permitted to be used by the first user to the first permission state in which the specific function is permitted to be used by the first user by referring to the first user authentication information registered in the authentication memory in association with the first device authentication information, and
wherein the first portable device comprises:
a second processor; and
second memory storing second computer-readable instructions therein, the second computer-readable instructions, when executed by the second processor, causing the first portable device to perform:
establishing the first connection with the function performing apparatus while the function performing apparatus is in the first permission state in which the specific function is permitted to be used by the first user;
establishing the second connection with the function performing apparatus while the function performing apparatus is in the first non-permission state in which the specific function is not permitted to be used by the first user after the first device authentication information is exchanged with the function performing apparatus; and
supplying the first device authentication information to the function performing apparatus in response to the second connection being established in order to allow the function performing apparatus to transition from the first non-permission state in which the specific function is not permitted to be used by the first user to the first permission state in which the specific function is permitted to be used by the first user, wherein supplying the first device authentication information includes accessing an authentication memory for referring to user authentication information that is stored in the authentication memory and is associated with the first device authentication information.

2. The authentication system according to claim 1,
wherein the first computer-readable instruction stored in the first memory, when executed by the first processor, cause the function performing apparatus to further perform:
supplying, to the first portable device, the specified first device authentication information in response to the first device authentication information being specified.

3. The authentication system according to claim 1,
wherein the second computer-readable instructions stored in the second memory, when executed by the second processor, cause the first portable device to further perform:
obtaining the first device authentication information from the function performing apparatus in response to the first connection with the function performing apparatus being established; and
storing the first device authentication information in the second memory in response to obtaining the first device authentication information from the function performing apparatus.

4. The authentication system according to claim 1,
wherein the first computer-readable instructions stored in the first memory, when executed by the first processor, cause the function performing apparatus to further perform:
generating the first device authentication information in a case where the first connection with the first portable device is established, and
wherein registering, in the authentication memory, the specified first device authentication information in association with the first user authentication information includes registering the generated first device authentication information in association with the first user authentication information.

5. The authentication system according to claim 1, wherein the second computer-readable instructions stored in the second memory, when executed by the second processor, cause the first portable device to further perform:
exchanging the first device authentication information with the function performing apparatus in response to the first connection with the function performing apparatus being established.

6. The authentication system according to claim 1, wherein the second computer-readable instructions stored in the second memory, when executed by the second processor, cause the first portable device to further perform:
   supplying the first device authentication information to the function performing apparatus in response to the first connection with the function performing apparatus being established, and
wherein the first computer-readable instructions stored in the first memory, when executed by the first processor, cause the function performing apparatus to further perform:
   receiving the first device authentication information in response to the first connection being established to specify the received first device authentication information and register the specified first device authentication information in the authentication memory.

7. The authentication system according to claim 1, wherein the registering of the first device authentication information is performed in a case where the first connection with the first portable device is established while the state of the function performing apparatus is the first permission state.

8. The authentication system according to claim 7, wherein the first computer-readable instructions, when executed by the first processor, cause the function performing apparatus to further perform:
establishing a third connection with a second portable device while the function performing apparatus is in the first permission state;
specifying second device authentication information in response to the third connection being established, wherein the second device authentication information is information for authenticating the second portable device;
in response to the second device authentication information being specified after the first device authentication information is registered in the authentication memory, registering, in the authentication memory, the specified second device authentication information in association with the first user authentication information by replacing the first device authentication information registered in association with the first user authentication information with the second device authentication information;
supplying, to the second portable device, the specified second device authentication information in response to the second device authentication information being specified;
establishing a fourth connection with the second portable device while the function performing apparatus is in the first non-permission state after the second device authentication information is specified;
obtaining, from the second portable device, the second device authentication information supplied to the second portable device in response to the fourth connection being established; and
in response to the second device authentication information being obtained from the second portable device while the second device authentication information is registered in the authentication memory, transitioning the function performing apparatus from the first non-permission state in which the specific function is not permitted to be used by the first user to the first permission state in which the specific function is permitted to be used by the first user by referring to the first user authentication information that is registered in the authentication memory in association with the second device authentication information.

9. The authentication system according to claim 1, wherein the first computer-readable instructions, when executed by the first processor, cause the function performing apparatus to further perform:
receiving, from a second user through the operation device, second user authentication information while the function performing apparatus is in a second non-permission state in which the specific function is not permitted to be used by the second user, wherein the second user authentication information is information for authenticating the second user and is different from the first user authentication information;
in response to receiving the second user authentication information while the second user authentication information is registered in the authentication memory, transitioning the function performing apparatus from the second non-permission state to a second permission state in which the specific function is permitted to be used by the second user;
establishing a third connection with a third portable device while the function performing apparatus is in the second permission state;
specifying a second device authentication information in response to the third connection being established, wherein the second device authentication information is information for authenticating the third portable device;
obtaining, from the third portable device, a third device authentication information in response to the third connection with the third portable device being established while the function performing apparatus is in the second permission state, the third device authentication information being stored in the third portable device in advance;
registering, in the authentication memory, the obtained third device authentication information in association with the second user authentication information in response to the third device authentication information being obtained from the third portable device; and
in response to the third device authentication information being obtained from the third portable device while the third device authentication information is registered in the authentication memory, transitioning the state of the function performing apparatus from the second non-permission state in which the specific function is not permitted to be used by the second user to the second permission state in which the specific function is permitted to be used by the second user by referring to the second user authentication information that is registered in the authentication memory in association with the third device authentication information.

10. The authentication system according to claim 1,
wherein the registering of the first device authentication information is performed in a case where predetermined application information is obtained from the first portable device,
wherein the registering of the first device authentication information is not performed in a case where the predetermined application information is not obtained from the first portable device, and
wherein the predetermined application information is supplied from the first portable device to the function performing apparatus in a case where an application configured to use the function performing apparatus is active in the first portable device.

11. The authentication system according to claim 1,
wherein the function performing apparatus further comprises:
an apparatus interface configured to operate in a plurality of modes including a first mode and a second mode,
wherein the first connection is a connection for causing the apparatus interface to operate in the first mode, and
wherein the second connection is a connection for causing the apparatus interface to operate in the second mode.

12. The authentication system according to claim 11,
wherein the first computer-readable instructions, when executed by the first processor, cause the function performing apparatus to further perform:
in a case where a connection with the first portable device is established, determining whether the first portable device is connected through the first connection for causing the apparatus interface to operate in the first mode or through the second connection for causing the apparatus interface to operate in the second mode;
determining that a first type of process is to be performed in a case where it is determined that the first portable device is connected through the first connection; and
determining that a second type of process is to be performed in a case where it is determined that the first portable device is connected through the second connection,
wherein the first type of process comprises the registering of the first device authentication information and the supplying of the first device authentication information, and
wherein the second type of process comprises the transitioning of the function performing apparatus from the first non-permission state to the first permission state in response to the first device authentication information being obtained from the first portable device.

13. The authentication system according to claim 11,
wherein the second mode includes a Reader/Writer mode of a near field communication protocol.

14. The authentication system according to claim 1,
wherein the first computer-readable instructions, when executed by the first processor, cause the function performing apparatus to perform:
in response to receiving the first user authentication information from the first user through the operation device, determining whether the received first user authentication information matches the first user authentication information having been registered in the authentication memory; and
transitioning the state of the function performing apparatus from the first non-permission state to the first permission state in response to determining that the received first user authentication information matches the first user authentication information having been registered in the authentication memory.

15. The authentication system according to claim 1,
wherein the first memory includes the authentication memory.

16. The authentication system according to claim 1,
wherein the receiving of the first user authentication information is performed on the condition that the first user authentication information has been registered in authentication memory of a specific device; and
wherein the registering is performed to register the first device authentication information in the authentication memory of the specific device.

* * * * *